(12) United States Patent
Einfalt

(10) Patent No.: US 8,954,347 B1
(45) Date of Patent: Feb. 10, 2015

(54) SYSTEM FOR MONITORING INVENTORY AND DISPENSING ACTIVITY OF A PLURALITY OF DIVERSE BEVERAGES

(75) Inventor: Christian Einfalt, Vienna (AT)

(73) Assignee: IP Maxx LLC, Fort Lauderdale, FL (US)

( * ) Notice: Subject to any disclaimer, the term of this patent is extended or adjusted under 35 U.S.C. 154(b) by 813 days.

(21) Appl. No.: 12/589,890

(22) Filed: Oct. 31, 2009

(51) Int. Cl.
*G06Q 30/00* (2012.01)
*G06Q 20/00* (2012.01)
*G08B 21/00* (2006.01)

(52) U.S. Cl.
USPC ............... 705/15; 705/16; 705/17; 705/22; 705/23; 340/613

(58) Field of Classification Search
CPC ............ B67D 3/0077; G01G 19/414; G01G 23/3735; G07F 13/04; G07F 13/065
See application file for complete search history.

(56) References Cited

U.S. PATENT DOCUMENTS

| | | | | |
|---|---|---|---|---|
| 4,997,012 | A * | 3/1991 | Kuziw | ............... 141/1 |
| 5,457,439 | A | 10/1995 | Kuhn | |
| 5,603,430 | A | 2/1997 | Loehrke et al. | |
| 5,986,219 | A | 11/1999 | Carroll et al. | |
| 6,036,055 | A | 3/2000 | Mogadam et al. | |
| 6,163,761 | A | 12/2000 | Kent | |
| 7,406,439 | B2 * | 7/2008 | Bodin et al. | ............... 705/22 |
| 2001/0007982 | A1 | 7/2001 | Brown | |
| 2002/0038165 | A1 | 3/2002 | McHale, IV et al. | |
| 2006/0238346 | A1 * | 10/2006 | Teller | ............... 340/572.1 |
| 2008/0082360 | A1 | 4/2008 | Bailey et al. | |
| 2009/0261974 | A1 | 10/2009 | Bailey et al. | |
| 2011/0073212 | A1 * | 3/2011 | Erbs et al. | ............... 141/1 |

* cited by examiner

*Primary Examiner* — Ryan Zeender
*Assistant Examiner* — Dana Amsdell
(74) *Attorney, Agent, or Firm* — Feldman Gale, P.A.; Rafael Perez-Pineiro

(57) ABSTRACT

A system for monitoring inventory, dispensing activities and irregularities associated with service and sale of beverages primarily, but not exclusively, liquor beverages. A processor includes display facilities and communication capabilities and is operatively associated with a scale assembly disposed in supporting relation to each of a plurality of containers associated with each of the plurality of beverages. RFID tags are connected to each of the beverage containers for wireless communication between tag readers associated with the scale assembly thereby providing beverage identification and recognition. A tracking application is associated with the processor and structured to monitor usage activities of the plurality of beverages in association with the scale assembly. The tracking application includes at least a bar monitoring function, inventory function, statistics function and setup function, each structured in association with the display facility of the processor to determine and visually generate various categories of data indicative of at least dispensing activities and inventory control of the plurality of beverages logged into the system.

9 Claims, 26 Drawing Sheets

FIG. 15

| | | | |
|---|---|---|---|
| 2010/01/12 5:47:51 p.m. | Main Bar Security Shift | Node[514]. Bottle without (or inoperable) RFID detected | |
| 2010/01/12 1:42:13 p.m. | Main Bar Security Shift | Node[514]. Bottle without (or inoperable) RFID detected | |
| 2010/01/12 06:00:00 a.m. | Main Bar | Barkeper change: Security Shift has logged in. | |
| 2010/01/12 04:00:14 a.m. | Main Bar Security Shift | Node[515]. Weight increased: Tequilla Sombrero Negro Silver (+101.6 cl). | Irregularity Example 2: Weight increase warning. This could indicate back pouring of a bartender. |
| 2010/01/12 04:00:14 a.m. | Main Bar Security Shift | Node[515]. Bottle returned after timeout: Tequilla Sombrero Negro Silver. | |
| 2010/01/12 01:30:47 a.m. | Main Bar Security Shift | 1X Gin Tonic used on voucher 5 cl. London Mill Dry Gin | |
| 2010/01/12 01:30:46 a.m. | Main Bar Security Shift | 1X Gin Tonic used on voucher 5 cl. London Mill Dry Gin | |
| 2010/01/12 01:15:50 a.m. | Main Bar Security Shift | Node[514]. Bottle without (or inoperable) RFID detected | |
| 2010/01/12 01:14:33 a.m. | Main Bar Security Shift | Node[516]. Bottle without (or inoperable) RFID detected | |
| 2010/01/12 01:14:29 a.m. | Main Bar Security Shift | 2.9 cl "Triple Sec" poured | |
| 2010/01/12 01:13:40 a.m. | Main Bar Security Shift | 1% Margerita used on voucher ?? | |
| 2010/01/12 00:54:00 a.m. | Main Bar Security Shift | Node[514]. Bottle without (or inoperable) RFID detected | |
| 2010/01/12 00:51:10 a.m. | Main Bar Security Shift | Node[703]. Bottle returned after timeout. Amaretto | |
| 2010/01/12 00:51:10 a.m. | Main Bar Security Shift | 4.2 cl "Amaretto" poured | |
| 2010/01/12 00:51:09 a.m. | Main Bar Security Shift | 13 cl "Myers's Ruto Original Dark" poured | |

FIG.16

| | ○ LIVETICKER — 42 | | |
|---|---|---|---|
| 2010/01/12 5:47:51 p.m. | Main Bar Security Shift | Node[514]. Bottle without (or inoperable) RFID detected | |
| 2010/01/12 1:42:13 p.m. | Main Bar Security Shift | Node[514]. Bottle without (or inoperable) RFID detected | |
| 2010/01/12 06:00:00 a.m. | Main Bar | Barkeper change: Security Shift has logged in. | |
| 2010/01/12 04:00:14 a.m. | Main Bar Security Shift | Node[515]. Weight increased: Tequilla Sombrero Negro Silver (+101.6 cl). | |
| 2010/01/12 04:00:14 a.m. | Main Bar Security Shift | Node[515]. Bottle returned after timeout: Tequilla Sombrero Negro Silver. | |
| 2010/01/12 | Main Bar | 1% Gin Tonic used on voucher | |

Irregularity Example 3:
Here you see the bartender rung up 1.5oz of Chivas and JW. If we do the math one was over poured the other under poured. Where else can I see my financial impact?

Irregularity Example 3:
Here we have poured 1.4oz of Chivas, 3oz of Jonnie Walker Gold. Did we pour too much, too little or just the right amount?

| 2010/01/12 01:13:40 a.m. | | e Sec" poured | |
| 2010/01/12 00:54:00 a.m. | Ma Secu | 1X Margarita used on voucher 5 cl. Tequila Sombrero Negro Silver | |
| 2010/01/12 00:51:10 a.m. | Main B Security | 3 fl.oz "Chivas Regal 18" poured | |
| 2010/01/12 00:51:10 a.m. | Main Bar Security Shift | 3 fl.oz "Johnnie Walker Gold" poured | |
| 2010/01/12 00:51:10 a.m. | Main Bar Security Shift | 1.5oz Johnnie Walker Gold used on voucher −1.5fl.oz. Johnnie Walker Gold label | |
| 2010/01/12 00:51:09 a.m. | Main Bar Security Shift | 1.5oz Chivas Regal 18 used on voucher −1.5fl.oz. Chivas Regal 18 | | suxessbar® systems

○ Shift Statistics Detail —— 44

Proftcenter:     Main Bar
Bartender:     Security Shift
Shift start:     11.01.2010 06:00:00
Shift end:     12.01.2010 06:00:00

| Art.No. | Name | used on voucher | Bar | missing | Balance |
|---|---|---|---|---|---|
| 18 | Bande de Coco | 3 fl.oz. | 0 fl.oz. | 0 fl.oz. | 3 fl.oz. |
| 26 | Cachaca Ypioca Ouro | 18 fl.oz. | 0 fl.oz. | 0 fl.oz. | |
| 108 | Ramazotti Amaro Falsina | 0 fl.oz. | -85.5 fl.oz. | 0 fl.oz. | 65.5 fl.oz. |
| 145 | Smirnoff No 21 | 12 fl.oz. | 16 fl.oz. | 0 fl.oz. | 4 fl.oz. |
| 130 | Tequila Sombrero Negro Silver | 40 fl.oz. | 3.7 fl.oz. | 0 fl.oz. | 36.3 fl.oz. |
| 87 | London Hill Dry Gin | 65 fl.oz. | 63.1 fl.oz. | 0 fl.oz. | 1.9 fl.oz. | back

[MCM Summary]
[Create/View Report]

Side menu (34): Home, Home, Logout, Bar, Barview, LiveTicker, Statistic, Shift Statistics, Reporting, Irregularities, Inventory, Bottle Information, Restock Requirements, Bottle Administration, Recipe Administration, Setup, Users, Groups Callout: Irregularity Example 3: In the Shift statistic screen view you can see:
In Red = Over pouring
In Green = Right on
In Black = Under Pouring Callout: If you press on the Management Summary you will get the following report

FIG. 18

 suxessbar* systems

User: Technician
Date: 2009/03/22 7:54 p.m.

Profitcenter: SuxessBar
Bartender: Mark
Shift start: 2009/03/22 7:24:00 p.m.
Shift end:

Management Summary

| Type | Poured [oz] | POS Billed [oz] | Variance [oz] | Expected Revenue [$] | Actual Revenue [$] | Loss [$] | Loss [%] |
|---|---|---|---|---|---|---|---|
| Vodka | Poured | Billed | Var | Exp | Act | Loss | Loss |
| Absolut Vodka | 13.5 | 12 | 1.5 | 27.46 | 24.33 | 3.12 | 11.4 |
| Skyy Vodka | 13.6 | 12 | 1.6 | 31.07 | 27.38 | 3.69 | 11.9 |
| Summary | 27.1 | 24 | 3.1 | 58.53 | 51.71 | 6.81 | 11.7 |
| Whisky | Poured | Billed | Var | Exp | Act | Loss | Loss |
| Chivas Regal 18 | 10.6 | 9 | 1.6 | 81.14 | 69.2 | 11.94 | 14.7 |
| Johnnie Walker Gold Label | 9.6 | 7.5 | 2.1 | 87.51 | 68.44 | 19.07 | 21.8 |
| Summary | 20.2 | 16.5 | 3.7 | 168.65 | 137.64 | 31.01 | 18.4 |
| Rum | Poured | Billed | Var | Exp | Act | Loss | Loss |
| Bacardi Superior Rum | 12.9 | 10.5 | 2.4 | 27.74 | 22.62 | 5.12 | 18.5 |
| Santa Teresa Rum | 11.9 | 10.5 | 1.4 | 28.59 | 25.29 | 3.31 | 11.6 |
| Summary | 24.8 | 21 | 3.8 | 56.33 | 47.91 | 8.43 | 14.9 |
| Brandy | Poured | Billed | Var | Exp | Act | Loss | Loss |
| Courvoisier Cognac | 11 | 9 | 2 | 48.69 | 39.92 | 8.77 | 18 |
| Summary | 11 | 9 | 2 | 48.69 | 39.92 | 8.77 | 18 |
| Overall Summary | 83.1 | 70.5 | 12.6 | 332.2 | 277.18 | 55.02 | 16.56 |

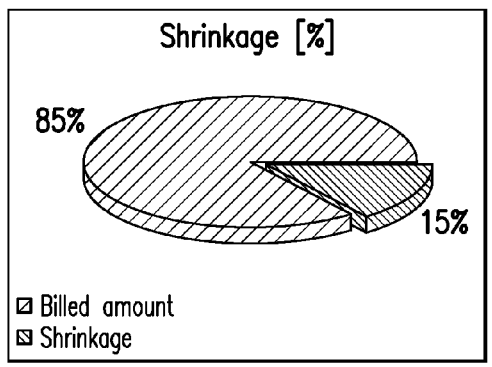

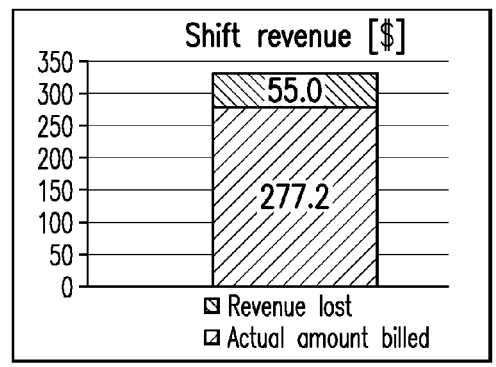

FIG.19A

| | SuxessBar Windows Internet Explorer | | | | | | | – ☐ × |
|---|---|---|---|---|---|---|---|---|
| ⊙ ⊙ ▸ | 🗐 http://showbar.suxessbar.com/bottleinfo | | | | | ▸▾◂ | Google | |
| ☆ ☆ | ◯ SuxessBar | | | | | 🏠 ▾ 🖻 ▾ ☐ ▾ ☐ Page ▾ ◯ Tools ▾ | | | ooo suxessbar° systems

Home
Home
Logout
Bar
Barview
LiveTicker
Statistic
Shift Statistics
Reporting
Irregularities
Inventory — 36
Bottle Information
Restock Requirements
Bottle Administration
Recipe Administration
Setup
Users
Groups
Mail Service
Options ○ Bottle Information — 48

Profitcenter [all ▾]
Bottle Catagory [all ▾]
Bottle Search [        ]

view
Create/View Report

*The Bottle Information Function will give you detailed information on bottle content and inventory*

| Art.No. | Name | Content | Shots | open | missing | Reserve |
|---|---|---|---|---|---|---|
| 1 | Absolut Vodka | 0 fl.oz. | 0.0 | 0 | 0 | 2 |
| 2 | Absolut Vodka Kurant | 0 fl.oz. | 0.0 | 0 | 1 | 2 |
| 4 | Agavero Licor de Tequila | 0 fl.oz. | 0.0 | 0 | 1 | 0 |
| 5 | Amaretto Venice Liquore | 0 fl.oz. | 0.0 | 0 | 2 | 2 |
| 7 | Aperol Apentro Italiano | 0 fl.oz. | 0.0 | 0 | 23 | 17 |
| 159 | Apricot Brandy | 0 fl.oz. | 0.0 | 0 | 0 | 1 |
| 8 | Auchentoshan 10 yo Lowland Single Malt Scotch Whisky | 12.5 fl.oz. | 3.1 | 1 | 0 | 0 |
| | Auchentoshan | | | | | |

FIG.20

| Name | EAN | Shot price | Puchase value | Minimum Stock |
|---|---|---|---|---|
| Absolut Vodka | 7312040012683 | 8 | 25 | 5 |
| Absolut Vodka | 0000000000000 | 8 | 27 | 5 |
| Absolut Vodka Kurant | 7312040020706 | 8 | 27 | 5 |
| Absolut Vodka Vanilla | 7312040060702 | 10 | 33 | 3 |
| Agavero Licor de Tequila | 5029977554007 | 7 | 22 | 1 |
| Amaretto | 0000080030713 | 7 | 22 | 1 |
| Amaretto | 4017773004865 | 7 | 22 | 5 |
| Amaretto Venice Liquore | 8002020009966 | 7 | 22 | 5 |
| Amaretto Venice Liquore | 8004410000768 | 7 | 22 | 2 |
| Amaretto | 8710194012780 | 7 | 22 | 1 |

In the Bottle Administration one can establish bottle data such as: Name, Id#, sales price, purchase cost, and minimum stock.

FIG.22

SYSTEM FOR MONITORING INVENTORY AND DISPENSING ACTIVITY OF A PLURALITY OF DIVERSE BEVERAGES

BACKGROUND OF THE INVENTION

1. Field of the Invention

The present invention is directed to a system for monitoring inventory as well as dispensing activities of a plurality of diverse beverages preferably, but not necessarily, liquor beverages. The system includes a tracking application including a plurality of predetermined functions and function modules which serve to determine and generate operating data indicative of regular and irregular activities associated with the stocking, dispensing, ordering, etc. of the plurality of diverse beverages.

2. Description of the Related Art

In the operation of certain commercial enterprises such as bars, lounges, restaurants, etc. it is important to maintain strict and accurate control of the various products being sold or dispensed. In particular, the dispensing of liquor beverages is of particular importance primarily, but not exclusively, due to the possibility of irregular activities associated with the sale and dispensing of such beverages. Such irregular activities may result in loss of profit due to spillage, theft or other inappropriate episodes inadvertently or purposely occurring. As such, employees responsible for dispensing activities as well as stocking, purchasing, etc. must be frequently and carefully monitored in an effective manner. Unfortunately, certain bartenders, servers and other personnel are practiced in avoiding scrutiny by many of the monitoring systems regardless of the relative sophistication thereof.

In order to overcome monetary losses associated with the dispensing and maintenance of a plurality of diverse liquor and other beverages, many attempts have been primarily directed to control over beverage dispensing techniques. However, the disadvantages and problems associated with such known systems are still prevalent. By way of example, it is known to weigh a beverage container for the purpose of determining the quantity of a given beverage in order to attempt to control the amount dispensed. However, systems limited to the monitoring by weight technique frequently do not provide an overall control and monitoring of additional potential irregular activities associated with the dispensing of the beverage as well as the storage, stocking, restocking, etc. Additional known or conventional attempts to further provide an adequate tracking or monitoring system involve the use of automatic dispensing machines, wherein the quantity of beverage pour can not be easily varied. As such, the owner or operator of the system incorporating an automatic and/or monitored dispensing machine can at least be assured of an accurate beverage pour, rather relying on the skill and honesty of a bartender or server. However, automatic pouring machine are frequently absent the capabilities relating to inventory control, management monitoring and costing and pricing of the diverse beverages typically maintained in bars, lounges, restaurants, etc.

Accordingly, there is a need in this industry for a system to accurately and efficiently monitor both inventory as well as dispensing activities of a plurality of beverages, wherein a number of commonly occurring irregular activities or episodes may be easily determined. Further, such a preferred and proposed system should provide the irregular activity data to authorized personnel for correction. In addition such a preferred monitoring system should also provide data composites of regular activities and irregular performance episodes, thereby allowing authorized personnel to efficiently determined adequate inventory and restocking requirements as well as pricing, costing and consistent vouchering between the quantities of beverages poured and the quantities of beverages sold.

SUMMARY OF THE INVENTION

This invention is directed to a system for monitoring the inventory and dispensing activities of a plurality of diverse beverages such as, but not limited to, liquors as they are commonly served or dispensed in a commercial environment such as a bar, lounge, restaurant, etc. The system includes the utilization of a processor having appropriate and predetermine communication capabilities over an appropriate communications network, such as the Internet. In addition, the processor includes display facilities provided both on-site and at possibly at remote locations, wherein operational or activity data is displayed. The generated and displayed data relates to the inventory and dispensing activities of each of the plurality of beverages initially or periodically logged into the system.

A scale assembly, preferably in the form of a plurality of scale structures, is associated with all of the plurality of beverages, such as by supporting the containers associated with the plurality of beverages on ant one of the scale structures of the scale assembly. Moreover, each scale structure is operative to determine the weight of the beverage container, thereby determining the quantity of the beverage within the container, in an effort to maintain effective control over the dispensing and sale thereof. The monitoring or tracking of the plurality of beverages within the system is accomplished utilizing a tracking application which is operative on the processor. The tracking application monitors the above noted inventory and dispensing activities, as well as the costs pricing and other administrative activities of the plurality of beverages.

Further, the various preferred embodiments of the monitoring system of the present invention comprise the tracking assembly preferably including a bar monitoring function, a statistics monitoring function, inventory monitoring function and set up function. As will be apparent from a more detailed description hereinafter provided, the operative versatility of the tracking application is such as to add complementary functions and/or modules such as initial access, log in/log out etc. In addition to the above, an identification assembly is structure to communicate beverage identification data for each of the beverages, as well as the container associated therewith, as the beverages and containers are "logged" in to the system. Such a registering or "logging-in" procedure may be accomplished through utilization of the aforementioned set-up function and may occur during an initial inventory set-up or alternatively as the beverage inventory is periodically restocked. More specifically, the identification assembly includes a plurality of RFID tags having specific and appropriate identification and/or recognition data associated therewith. As such, each of the RFID tags are mounted on a different one of the beverage containers and initially logged into the system and/or tracking application through an associated bar reader or other identifying procedure, wherein the code or other identification data associated with the RFID tags are "married" to a corresponding one of the beverage containers.

The identification assembly further comprises a tag reader assembly associated with the scale assembly and in at least one embodiment defining a plurality of tag reader each of which are associated with a different one of the scale structures.

In use, each of the scale structures and the tag reader associated therewith will instantaneously recognize and identify any beverage container, as well as the beverage associated therewith, based on otherwise associated with the individual scale structure through wireless communication between the corresponding RFID tags and the tags readers associated with corresponding ones of the scale structure.

As set forth above communicative association with the scale assembly and/or each of the scale structures and the processor will allow an accurate and detailed monitoring of the inventory as well as the regular and irregular activities associated with dispensing and/or handling of the beverage containers and the beverages contained therein.

Additional operative features associated with the tracking application of the present invention and more specifically the plurality of application function as set forth above includes the provision of designated function modules associated with predetermined ones of the application functions. As such, the application functions and corresponding ones of the function modules are structured and associated with the display facility of the processor to determine and visually generate data. Such generated data facilitates an accurate an efficient monitoring of the inventory, dispensing activities and administrative procedures. Also, users of the system and associated and the responsibilities and duties of each such user may be established, edited and monitored as the user's duties and activities relate to a determination or indication of irregular activities associated with either the inventory, dispensing or handling of the plurality of beverages associated with the system.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 15 is a schematic representation in the form of a screen shot associated with the function of the tracking application as represented in FIGS. 1 and 2.

FIG. 16 is a schematic representation in the form of a screen shot associated with the function of the tracking application as represented in FIGS. 1 and 2.

FIG. 18 is a schematic representation in the form of a screen shot directed to a function of the tracking application as represented in FIGS. 1 and 3.

FIG. 19A is a composite schematic representation in the form of a Management Summary and/or report including statistical graphics indicating cost emphasis of certain irregular activities relating to differences between the quantities of beverages dispensed and vouchered in monetary terms.

FIG. 20 is a schematic representation in the form of a screen shot directed to a function of the tracking application as represented in FIGS. 1 and 3.

FIG. 22 is a schematic representation in the form of a screen shot associated with a function of the tracking assembly as primarily represented in FIGS. 1 and 4.

Like reference numerals refer to like parts throughout the several views of the drawings.

DETAILED DESCRIPTION OF THE PREFERRED EMBODIMENT

Figure 1:
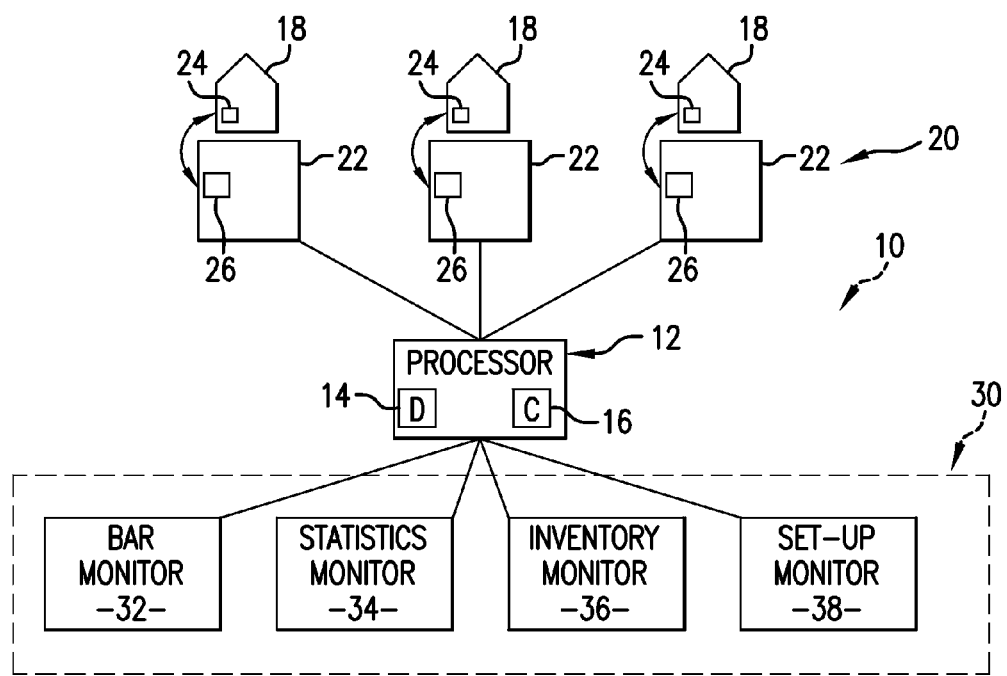
FIG. 1 is a schematic representation in block diagram form of at least one preferred embodiment of the system of the present invention.

As shown in the accompanying Figures, the present invention is directed to a system, generally indicated as 10, for monitoring inventory as well as dispensing and administrative activities of a plurality of diverse beverages, such as liquors, with an conventional commercial environment, such as a bar, lounge, restaurant, etc. More specifically operation of at least one preferred embodiment of the system 10 is sufficiently versatile to determine the occurrence of any irregular activity associated with the dispensing of the beverages, their storage and predetermined handling procedures. The determination of all important regular and irregular activities include episodes associated with their dispensing, storage, stocking, restocking, pricing, costing, as well as a variety of other activities which assure an accurate accounting of the plurality of beverages. Moreover, the system 10 of the present invention accomplishes the obtaining of a maximum profit margin by avoiding and/or at least recognizing the problems which typically or atypically occur such as, but not limited to, spillage, theft, mishandling, etc.

More specifically, the system 10 includes at least one processor 12 including both display facilities 14 and communication capabilities 16. As such, the processor may be in the form of a substantially conventional PC or other appropriate processor facility which includes or is operatively associated with a display screen 14. In addition, the processor 12 is capable of communication with other processors, wherein the primary processor 12 as well as the additional processors may be located on site and/or at various remote locations so as to enable authorized personnel to monitor the tracked activities of the plurality of beverages. Such communication between the processor 12 and any one or more remote processor may occur over the Internet or any other appropriate communication network.

As set forth above, the primary purpose of the preferred environment of the system of the present invention is to monitor control and/or correct irregular activities to assure a maximum profit to the owners or operators of the commercial environment in which the plurality of beverages are dispensed and sold. As such, each of the beverages are disposed in a conventional, commercial container 18 in which the individual beverages are sold. As is well known, such beverage containers 18 are obtained from the supplier or wholesaler by the bar, restaurant, etc.

In addition, the system of the present invention also includes a scale assembly generally indicated as 20 which, in at least one preferred embodiment, comprises a plurality of scale structures 22. The scale assembly 20, as well as the plurality of scale structures 22, is structured for operative communication with the processor 12, as will be explained in greater detailed hereinafter. In addition, the system 10 includes an identification assembly comprising a plurality of RFID tags 24 each of which are secured to or otherwise directly associated with a different one of each of the beverage containers 18, as the plurality of beverages and the corresponding beverage containers are registered or "logged" into the system 10. The "log-in" procedure may be accomplished by utilization of a bar code reader or other type of reading or recognition device used to directly associate or "marry" each of the beverage containers 18 having an appropriate identification code with the identification and/or recognition code associated with each of the RFID tags 24. Because the beverage bottles 18 are quickly replaced by a restocking of the beverages that have been dispensed, at least one embodiment of the system 10 of the present invention comprises the RFID tags 24 being structured to be re-useable. Because of this re-useable feature, the RFID tags must be connected to or otherwise associated with the beverage containers 18 in a manner that will facilitate their removal without damage or destruction, thereby enabling the authorized re-connection of the RFID tags to successively restocked beverage containers 18.

The identification assembly also comprises a reader assembly preferably comprising a plurality of individuals RFID tag readers 26 associated with the scale assembly 20 and more specifically with each of the scale structures 22. Each of the RFID tag readers 26 is cooperatively structured to communicate with each of the RFID tags 24 by wireless communication. Further, the operative versatility of each of the readers 26 will allow it to sense and read any of the plurality of RFID tags 24 associated with each of the beverage containers 18 corresponding to a given beverage. As a result placement of the beverage containers 18 in an operative position in a bar or other serving area comprises each of the beverage containers 18 being placed on the scale assembly 20 and more specifically on any one of the scale structures 22. As such, any of the scale structures 22 will recognize and identify any one of the beverage container 18 placed thereon through the aforementioned wireless communication between the corresponding RFID tag 24 and the corresponding reader 26.

As a result each of the scale structures 22 will read and recognize which one of the pluralities of beverages is placed thereon. Further, the scale assembly 20, including the scale structures 22, is structured for continuous weight monitoring capabilities, wherein the weight of each of the container bottle 18 and corresponding beverage is continuously monitored and known. This may differ from certain conventional scale structures, wherein the weight of the container bottle 18 is only determined upon initial placement of the container on the individual scale structure and/or when the beverage container is removed there from. This continuous weight monitoring by the scale assembly 20 and each of the scale structures 22 eliminates the possibility of a weight variance and therefore quantity variance of the beverage by adding to the beverage or removing some of the beverage from the beverage container 18 while on the individual scale structures 22.

Another feature of the system 10 of the present invention includes the provision of a tracking application generally indicated as 30. As represented in FIG. 1 and as individually represented in greater detail in FIGS. 2 through 5, the tracking application 30 includes a plurality of application functions, each of which are operative through processor 12, as is the entire tracking application 30. Accordingly, predetermined data representative of monitoring the inventory and dispensing activities as well as the overall administration of the plurality of beverages may be generated, visually observed, stored in an appropriate database and otherwise utilized to accomplish the efficient dispensing and/or sale of the plurality of beverages, with maximum efficiency, by recognizing, indicating and providing for the correction of any irregular activity associated with the storage, stocking, dispensing, vouchering, handling, etc. of the plurality of diverse beverages. More specifically, the functional applications associated with the tracking application 30 includes a bar monitoring function 32, a statistic monitoring function 34, an inventory monitoring function 36 and a set-up monitoring function 38. All of these functional applications 32, 34, 36 and 38 will be described in greater detail with primary reference to the schematic representation of FIGS. 2 through 5, as well as the schematic representation in the form of screen shots presented in the embodiments of FIGS. 6 through 27.

Figure 2:
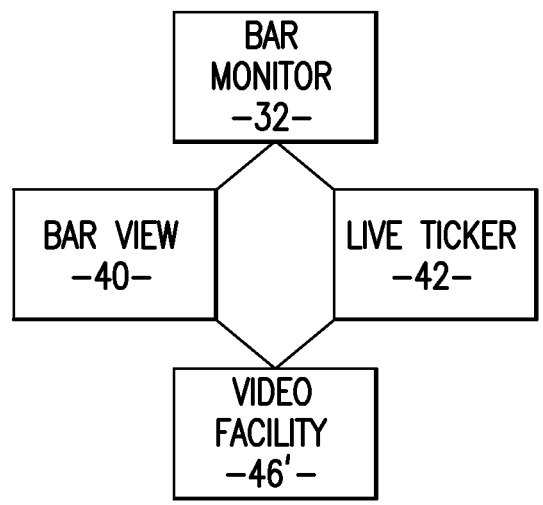
FIG. 2 is a schematic representation in block diagram form of at least one application function of the system in accord with the embodiment of FIG. 1.
Figure 3:
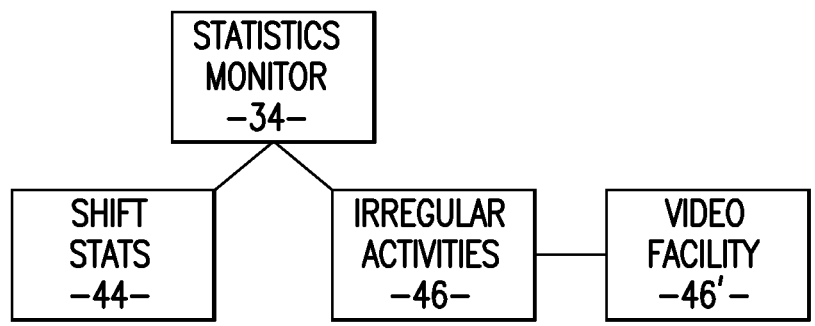
FIG. 3 is a schematic representation in block diagram form of at least one application function of the system in accord with the embodiment of FIG. 1.
Figure 4:
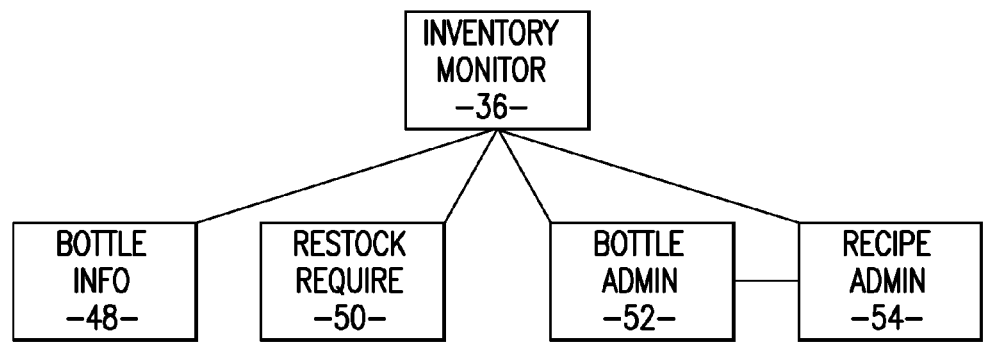
FIG. 4 is a schematic representation in block diagram form of at least one application function of the system in accord with the embodiment of FIG. 1.
Figure 5:
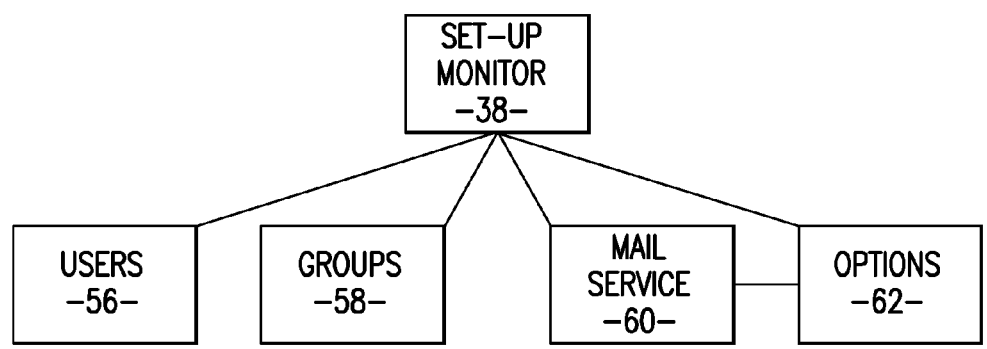
FIG. 5 is a schematic representation in block diagram form of at least one application function of the system in accord with the embodiment of FIG. 1.

Accordingly, with primary reference to FIGS. 1 and 2, the bar monitoring function 32 includes a plurality of function modules comprising a bar view module 40 and a "live ticker" module 42. As represented in the embodiment of FIGS. 1 and 3 the statistics monitoring function 34 comprises at least two function modules including "shift statistics" module 44 and an irregular activity module 46. With primary reference to the embodiments of FIGS. 1 and 4, the tracking application 30 includes the inventory function 36 which in turn comprises a plurality of function modules schematically represented as a bottle information module 48, a re-stock requirements module 50, a bottle administration module 52 and a recipe administration module 54. The tracking application 30 also includes the aforementioned set-up function 38 which in turn includes a plurality of functional modules comprising a user's module 56, a group's module 58, a mail service module 60 and an options module 62.

Figure 6:
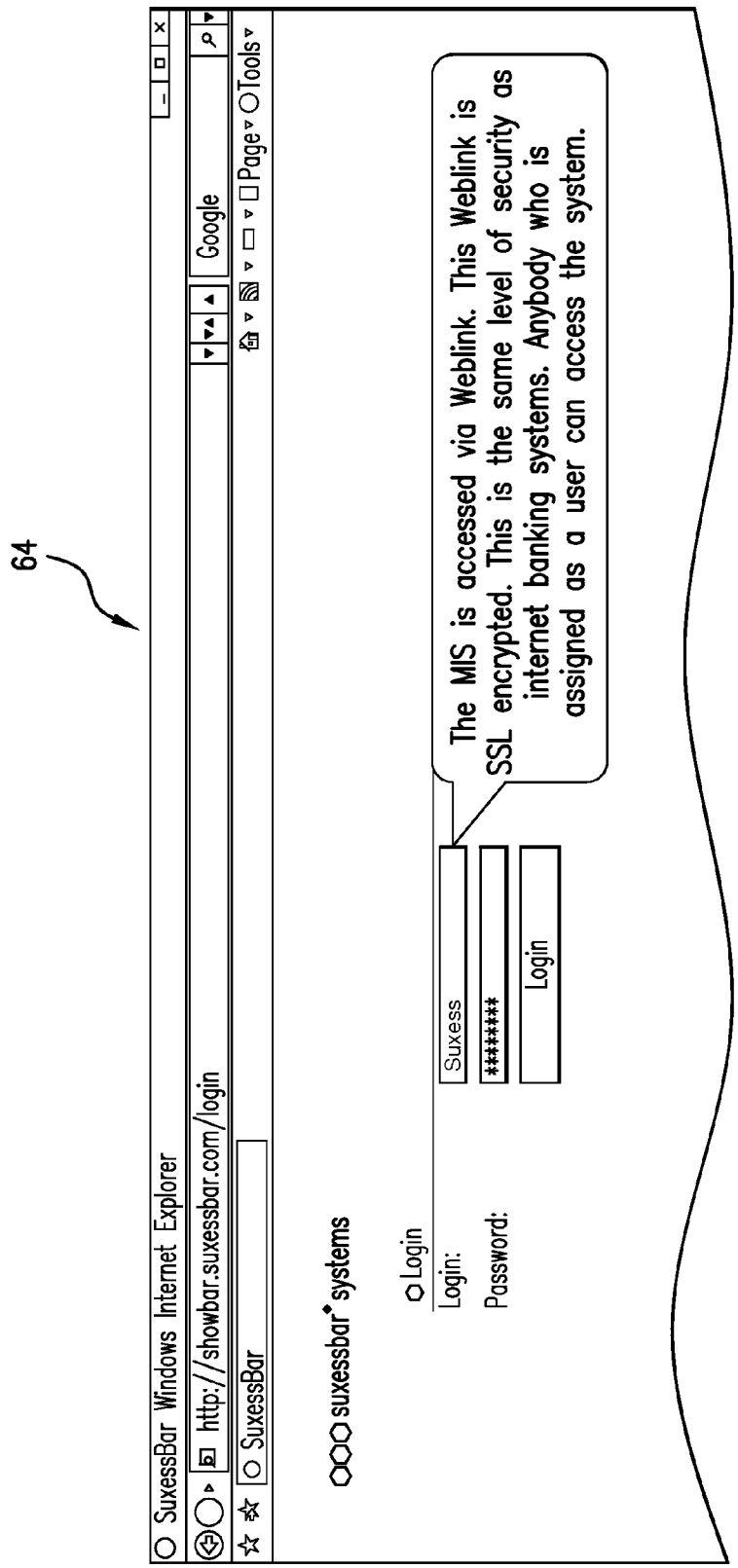
FIG. 6 is a schematic representation in the form of a screen shot indicating a home/log-in function of a tracking application associated with the embodiment of FIGS. 1-5.
Figure 7:
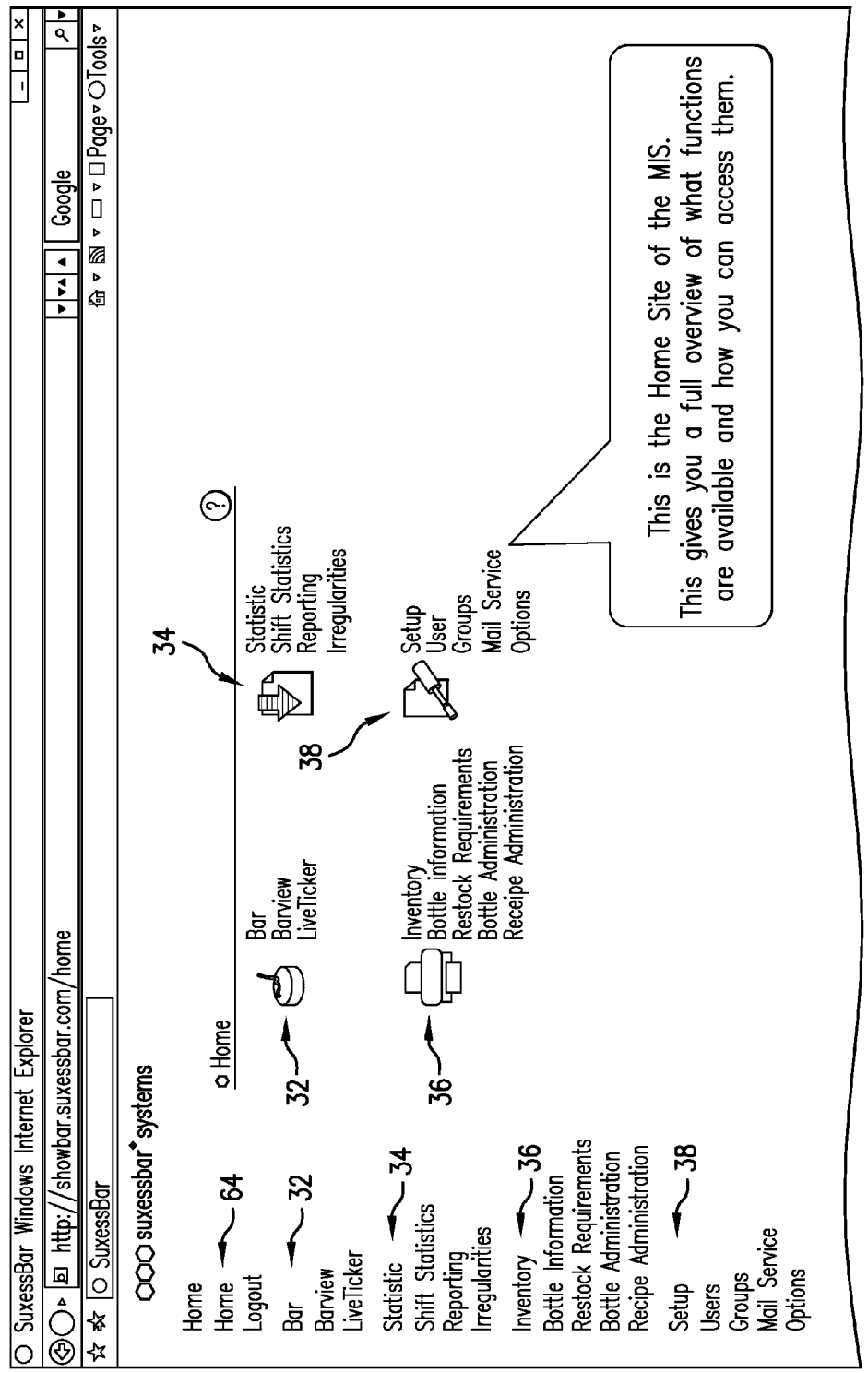
FIG. 7 is a schematic representation in the form of a screen shot representative of applications associated with a tracking application operative in accordance with the system of the embodiment of FIGS. 1-5.
Figure 8:
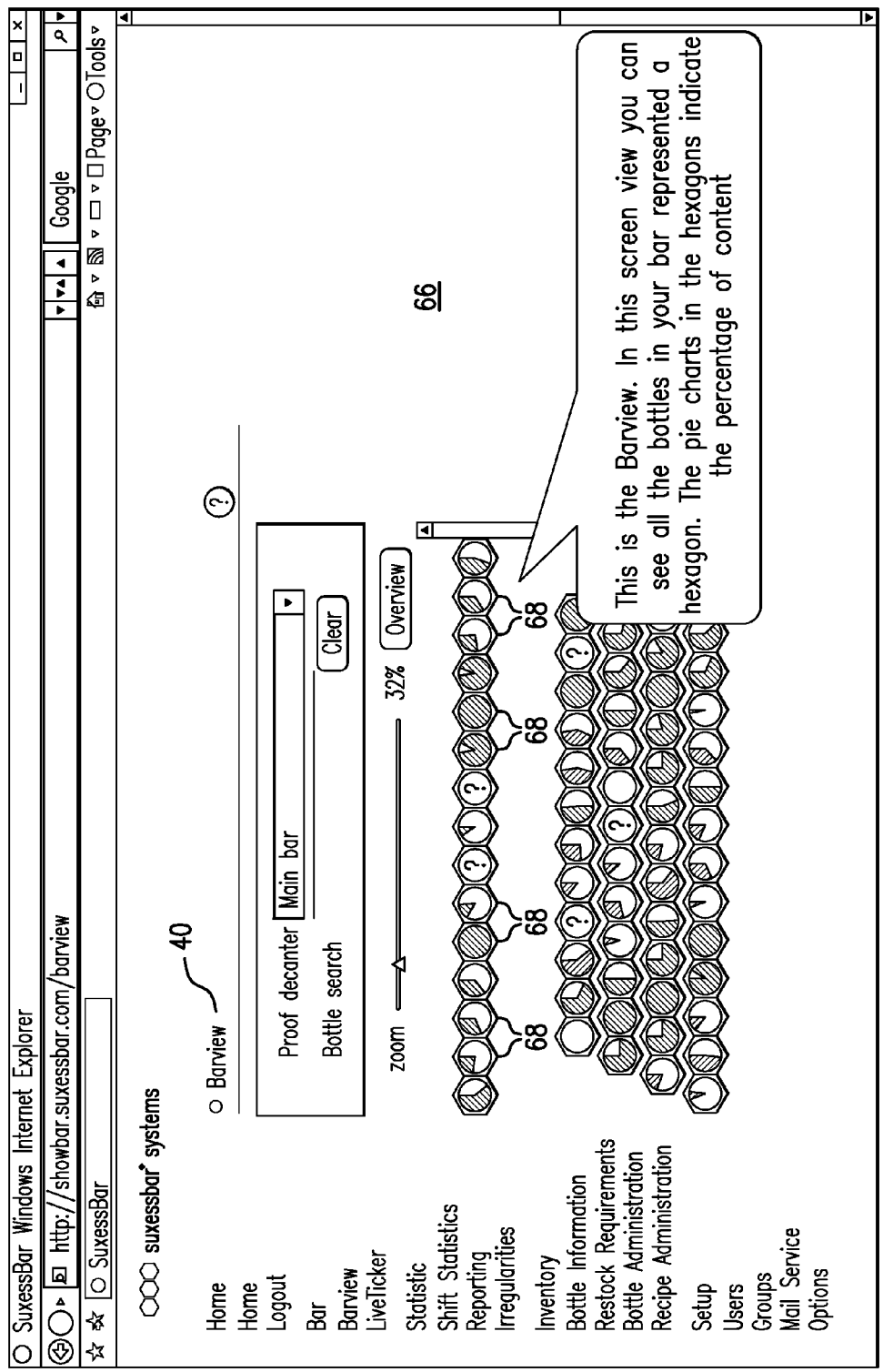
FIG. 8 is a schematic representation in the form of a screen shot associated with one of the tracking application functions of the embodiment of FIGS. 1 and 2.

With primary reference to FIG. 6, utilization and operation of the system 10 of the present invention, including the cooperative operation of the tracking assembly 30, is initiated by an appropriate log-in by authorized personnel. As such, encrypted passwords, codes, etc. can be provided to each of a plurality of authorized users as will be explained in greater detailed with primary reference to set-up function 38. Accordingly, any authorized individual that is assigned an appropriate code, password, etc. can access the system through processor 12 or any other computer/processor facility in communication therewith. In at least one embodiment, accessing the system 10 may be accomplished by accessing an appropriate website through conventional linking technology. Once access is acquired, the user will be initially directed to a home page of the system 10 represented in FIG. 7 wherein access to the home page, log-in/log out procedures, etc. is accomplished through the home function 64 also associated with the tracking system 30 or a browser function of the processor 12. Once the home site 64 is accessed, the user will then have selective access to any of the plurality of bar monitoring functions 32, statistics monitoring function 34, inventory monitoring function 36 and/or set up monitoring function 38.

For purposes of clarity, it will be assumed that the authorizing user will select the bar monitoring function 32 and each of the functioning modules comprising the bar view module 40 and the live ticker module 42. Accordingly, with primary reference to FIGS. 8 through 12, access to the bar view module 32 will provide a generation on the display facilities 14 of the processor 12 of an "icon display" generally indicated as 66. The icon display 66 is indicative of the monitored predetermined activity data of each of the plurality of beverages primarily, but not exclusively, relating to the dispensing activity of the beverages. The dispensing activities will include the determination of an occurrence of any irregular activities which do not conform to the intended dispensing procedure. More specifically, the icon display 66 comprises a plurality of changeable icons 68. Each of the icons 68 is representative of at least a quantity of the beverages maintained in each of the beverage containers 18, which are supported by and communicate with the scale assembly 20 and more specifically each of the scale structures 22. As set forth above the identification assembly including the RFID tags 24 and the associated readers 26 will be cooperatively structured to identify each of the beverage containers 18 and as a result each of the specific beverages within the beverage containers 18.

Figure 9:
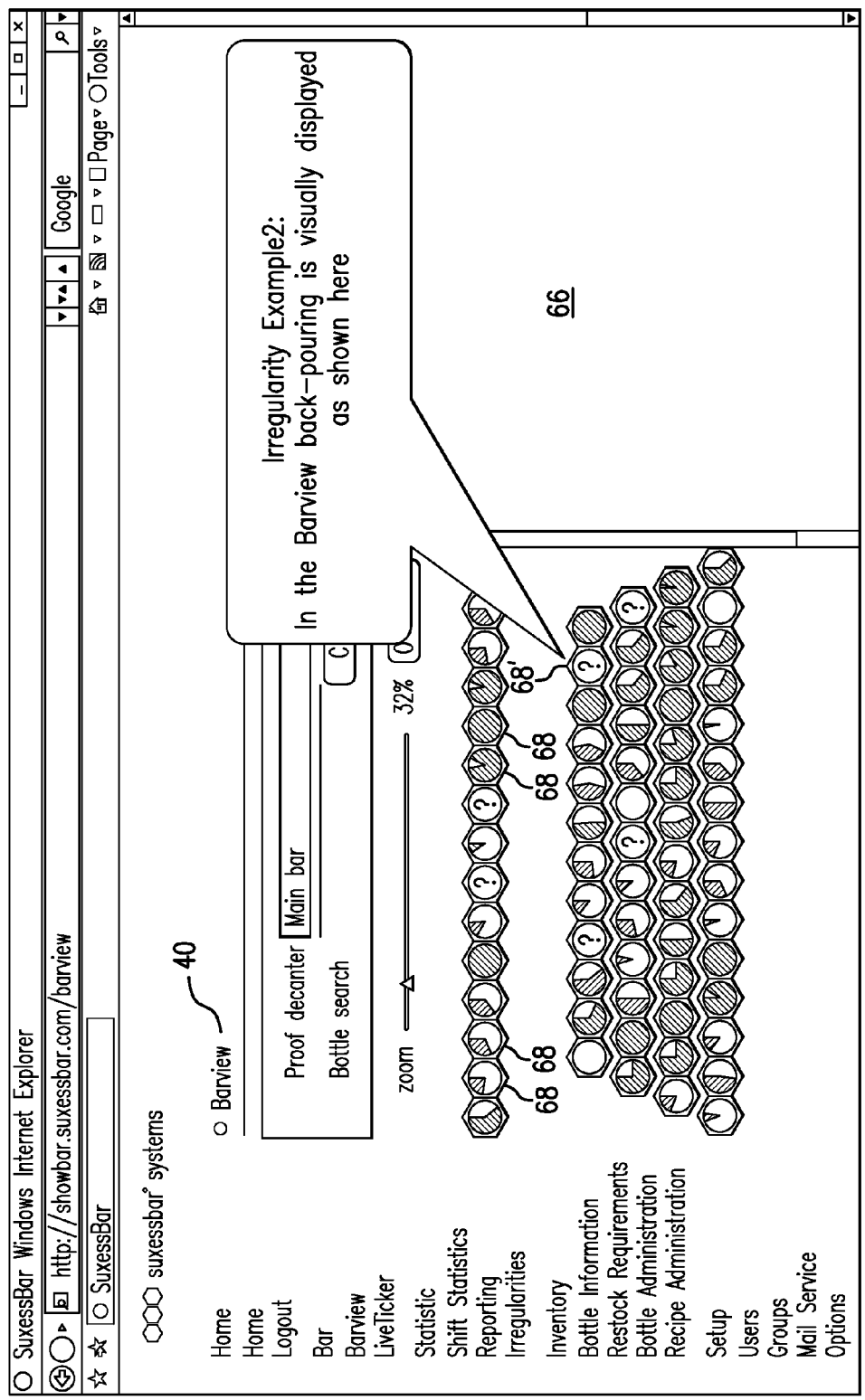
FIG. 9 is a schematic representation in the form of a screen shot associated with one of the tracking application functions of the embodiment of FIGS. 1 and 2.

Further, each of the changeable icons 68 is representative of the existing quantity of beverage within each of the beverage containers 18. The variable nature of the icon 68 provides a visual indication in real time as to when and how the quantity of beverage changes, as that beverage is dispensed. It is of course noted that while a plurality of seven variable icons 68 are represented on the icon display 66, the actual icon display 66 will include a plurality of icons 68 equal in number to the plurality of beverage containers 18 associated with different ones of the scale structures 22. As represented in FIG. 9, each of the icons, such as at 68', are also structured to provide an automatic alarm or signal indicating an irregular activity associated with a corresponding one the beverage containers 18 supported by the corresponding scale structures 22. As indicated by the included legend in FIG. 9, the irregular activity in this case may be a "back pouring" of a beverage into the corresponding beverage container 18. Such back pouring comprises the adding of additional liquid, liquor, etc. to the corresponding beverage container 18 which is prohibited in accordance with the normal, regular and/or predetermined established activities associated with the operation of the system 10.

Figure 10:
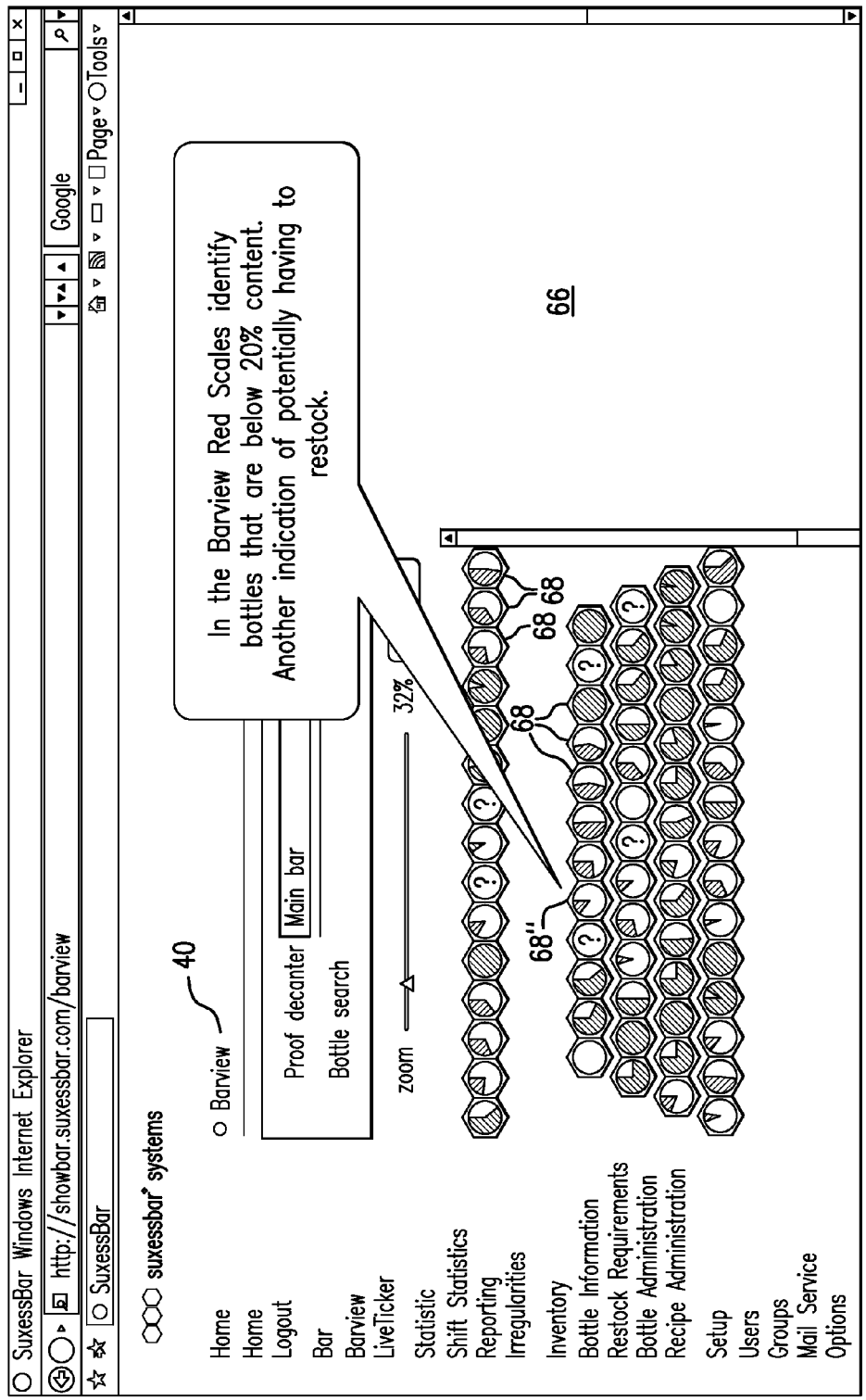
FIG. 10 is a schematic representation in the form of a screen shot associated with one of the tracking application functions of the embodiment of FIGS. 1 and 2.

With primary reference to the schematic representation of the screen shot of FIG. 10, another automatic alarm signal will be generated to provide an authorized user with a clear indication that a predetermined minimum quantity within a given beverage container has been reached. The predetermined minimum quantity may be indicative of an approaching restocking or reordering schedule, wherein the quantity of the beverage within the corresponding beverage container 18 is at or below a predetermined quantity, such as 20%. The automatic alarm indication represented in FIG. 10 may be a color change of the data indicia or any appropriate variation of the changeable icon 68", which efficiently demonstrates the "minimum quantity" alert signal.

Figure 11:
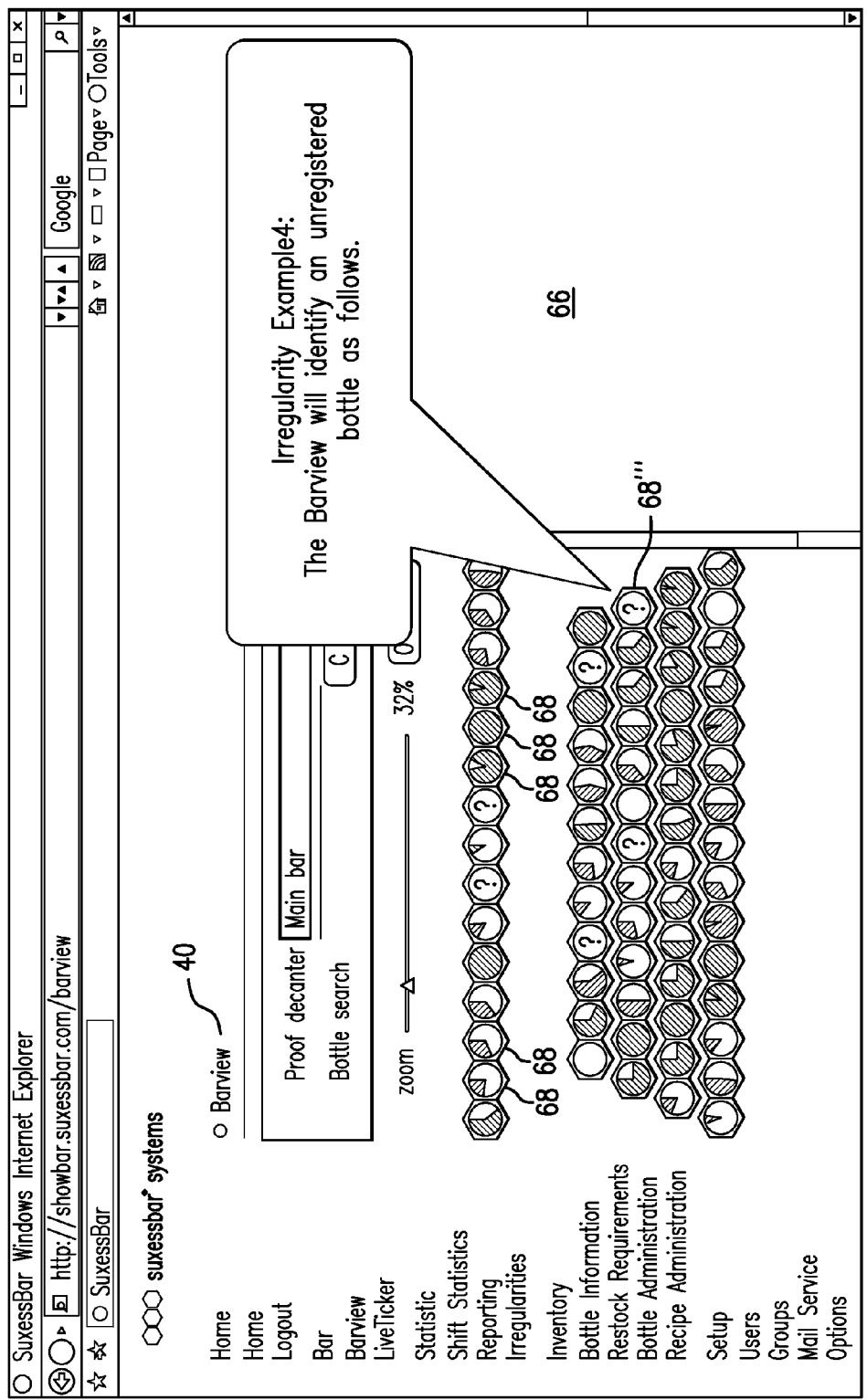
FIG. 11 is a schematic representation in form of a screen shot indicative of a display of detailed beverage identification information primarily associated with the embodiment of FIGS. 1 and 2.

With primary reference to the schematic representation in the screen shot of FIG. 11, yet another irregular activity detected by the bar view module 40 is the attempted use of a beverage container which has not been entered into the system, such as by not being registered or "logged-in". Again, as set forth above each of the beverage containers 18 will be registered or "logged in" to the system 10 through the application of the RFID tag 24 to each of the authorized beverage containers 18. The cooperative communication between the corresponding reader 26 and the corresponding RFID tag 24 associated with each beverage container 18 will establish that the supported beverage container 18 has in fact been logged in. However, in the episode of FIG. 11, at least one of the scale structures 22 may support and/or be directly associated with a beverage container which has not been properly logged in, but which is associated with the icon 68'''. This episode may indicate an attempt by an employee to pour from unregistered bottle. However, it is also recognized that an indication of the icon 68" of an unregistered container may also be caused by an inactive or malfunctioning RFID tag 24 and/or corresponding scale structure 22. In either situation, the irregular episode or activity is brought to the attention of supervisory personnel.

Figure 12:
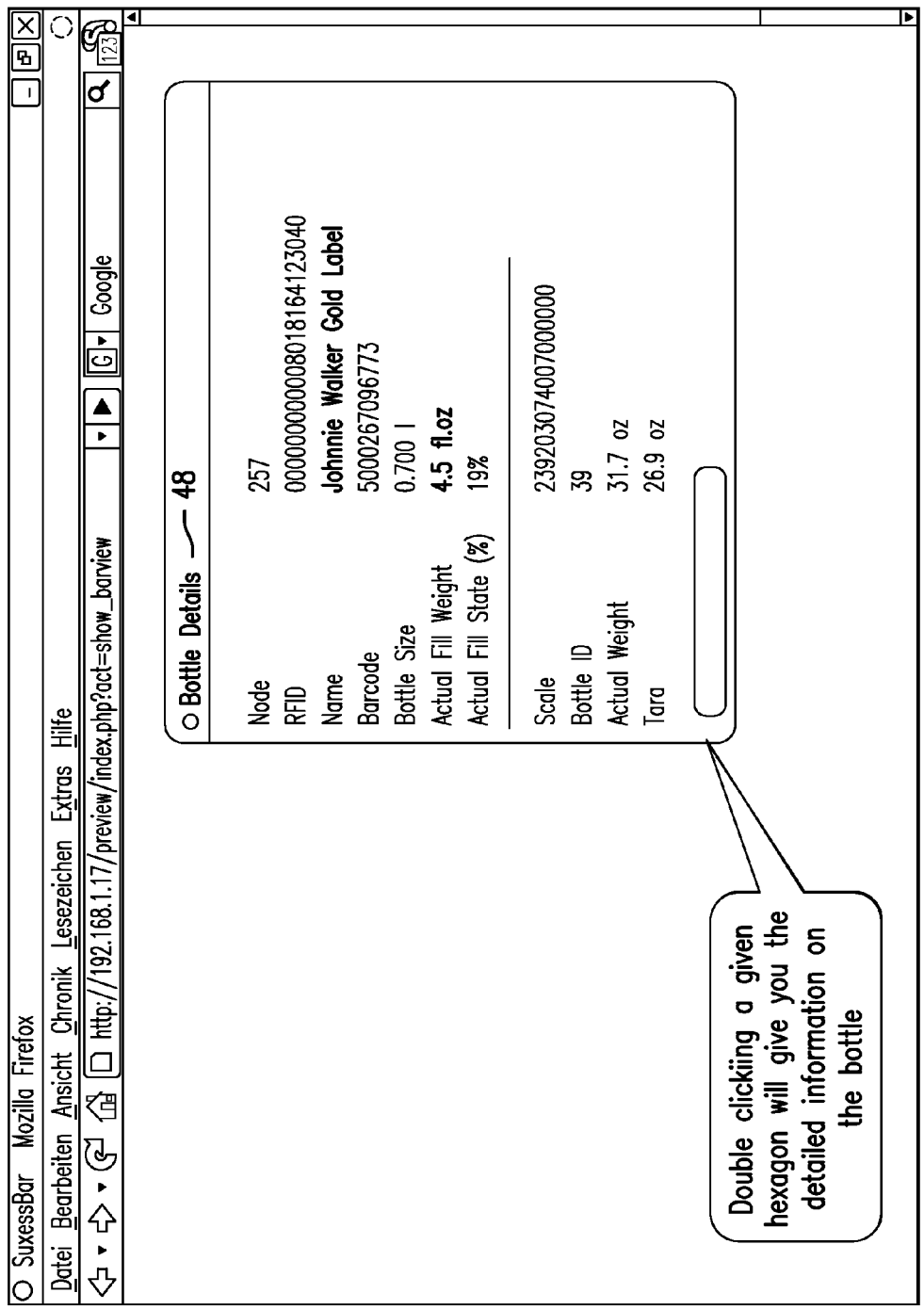
FIG. 12 is a schematic representation in the form of a screen shot associated with one of the tracking application functions of the embodiment of FIGS. 1 and 2.
Figure 13:
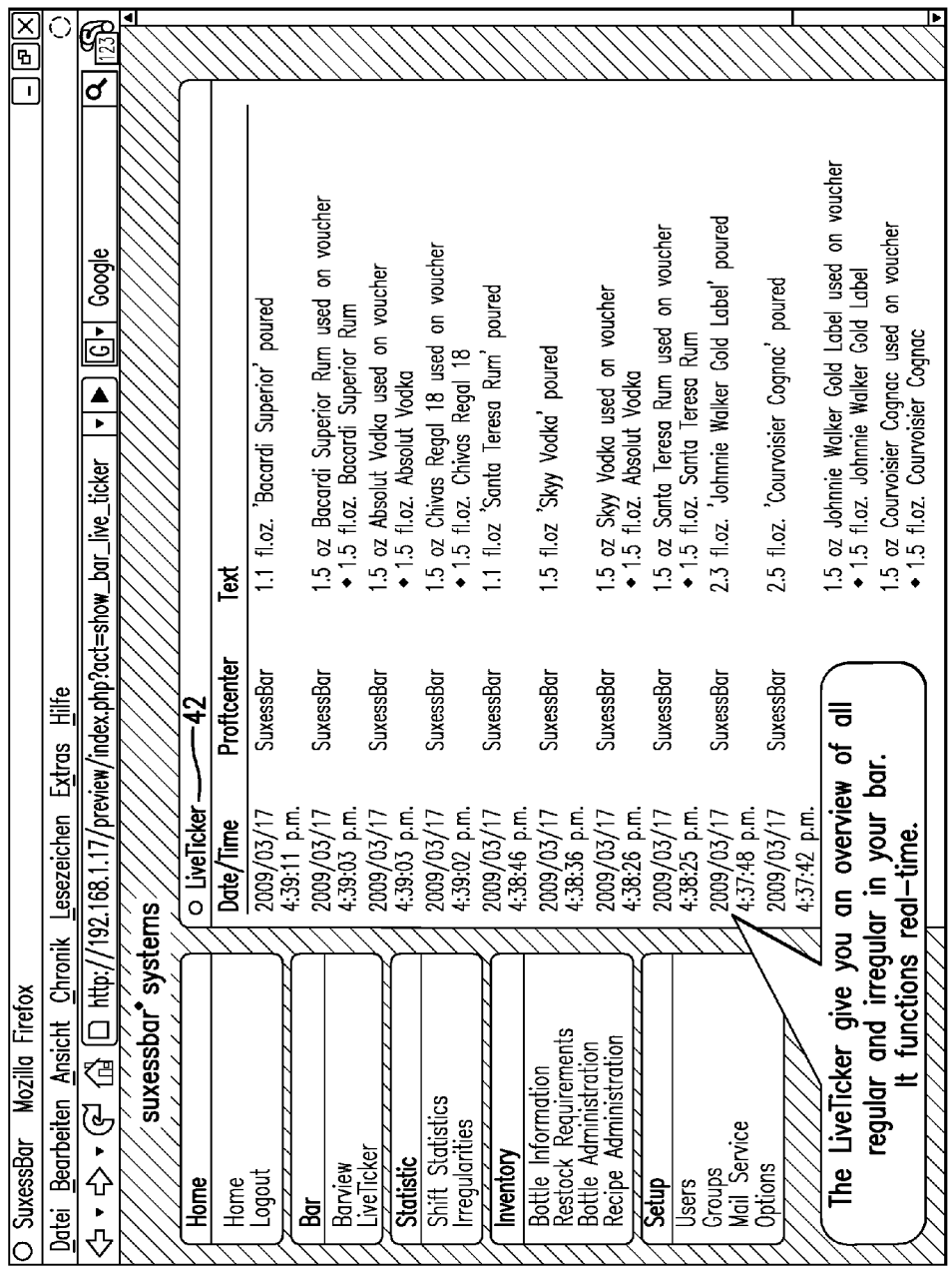
FIG. 13 is a schematic representation in the form of a screen shot associated with the function of the tracking application as represented in FIGS. 1 and 2.
Figure 14:
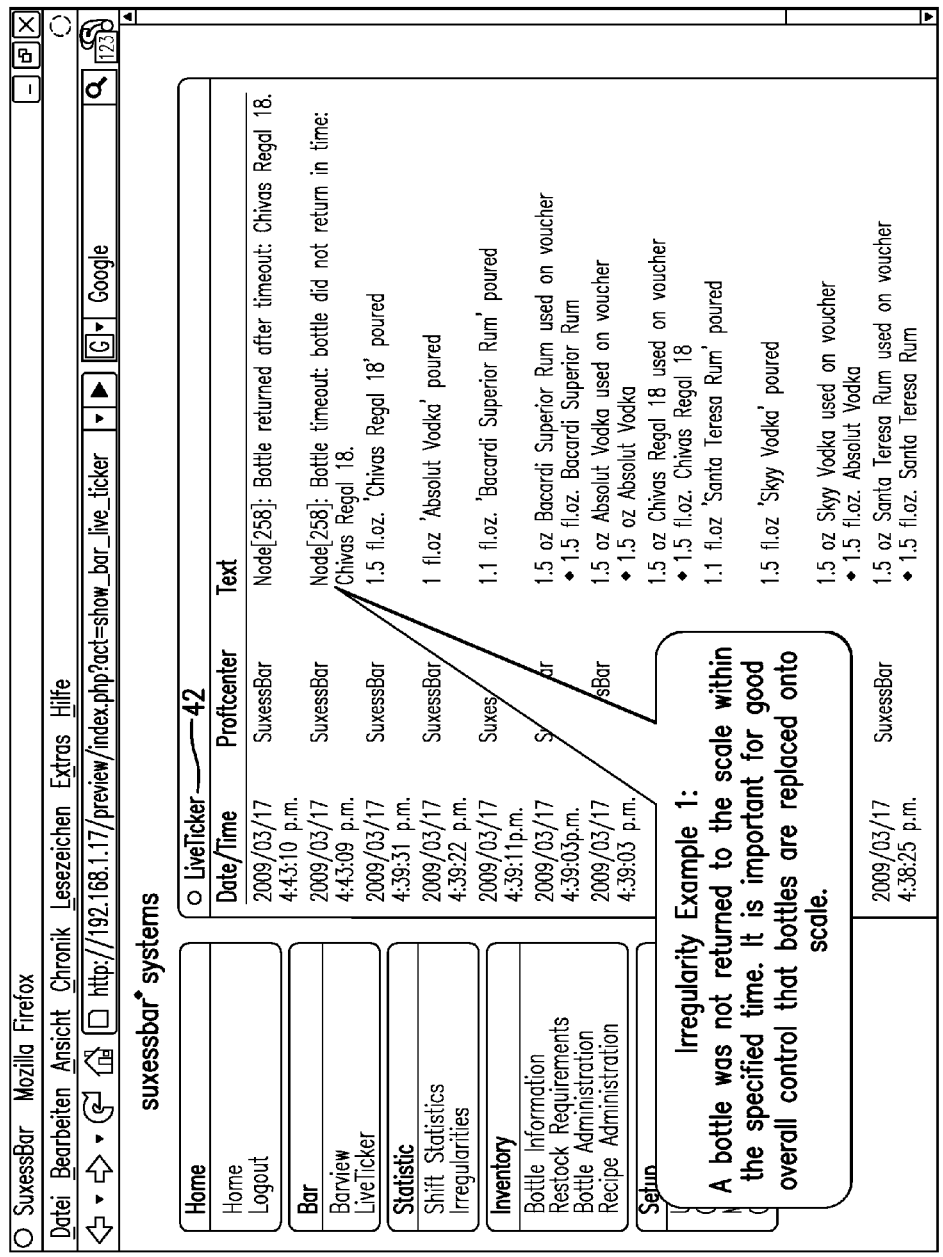
FIG. 14 is a schematic representation in the form of a screen shot associated with the function of the tracking application as represented in FIGS. 1 and 2.

With primary reference to the schematic representation of the screen shot of FIG. 12, each of the icons 68 displayed on the icon displayed 66 is structured to provide a selective access to the administration and/or identification information or data associated with the corresponding beverage and beverage container 18 on any given scale structure 22. As previously noted, each of the icons 68 represent a visual presentation of a different one of the scale structures 22. Due to the communication between the corresponding reader 26 and the RFID tag 24 on the associated beverage container 18, the beverage and beverage container 18 supported by any given scale structure 22 can be identified. Therefore, a clicking or "double clicking" on any given icons 68 will serve to generate the visual display of a manager's report appearing on the screen shot of FIG. 12. More specifically, information data about the beverage and/or the bottle container 18 will be clearly displayed, including its identification, quantity or fill weight, bottle identification, actual or intended weight, as well as the identification of the particular scale structure 22 and associated RFID tag 24.

With primary reference to the schematic representation in screen shots of FIGS. 13 through 17, the bar monitoring function 32 also includes a real time functioning "live ticker" module 42. The live ticker module is structured in cooperation with the display facilities 14 of processor 12 for determination or display of irregular activity data of the plurality of beverages. As such, the irregular activity data comprises an inaccurate dispensing of pre-set quantities of anyone of the plurality of beverages. By way of example, a typical "pour" may be predetermined to be 1.5 ounces of beverage. Any variance from the 1.5 ounce pour will be determined and visually presented as an irregular activity through cooperative functioning of the determination of the quantity or weight of any beverage within the beverage container 18, the operative communication between the corresponding scale structure 22 and the processor, and the determination, indication and display of such irregular activity as represented in FIGS. 14 through 17.

Further by way of example, the live ticker module 42 will provide an overview of all regular and irregular activities at the bar or other dispensing site. Further, such regular and irregular activity data will be provided on a real time basis. An additional example of such an irregular activity is an indication of a beverage container "time out". Upon the initial set up or entering of the beverage container 18 in accord with "log in" procedure, a "use time" or "pour time" will be established, such as 15 seconds, 30 seconds, etc. Therefore, the bartender or server has a preset period of time of 15 seconds, 30 seconds, etc. to remove the ordered beverage from the corresponding scale structure 22, accomplish a pour and return the beverage container 18 to the same or any appropriate scale structure 22. If the pour time exceeds the preset amount of 15 seconds, 30 seconds, etc. such "time out" will be logged in as an irregular activity.

Yet another example of an irregular activity generated by the live ticker module 42 would be the aforementioned "back pouring" wherein a bartender adds liquid or liquid to a given beverage container 18. Such quantity variance will be determined by the corresponding scale structure 22 and such irregular activity or increasing quantity of the corresponding beverage will be communicated to the processor and indicated, generated and displayed to the display facilities 14 of the processor 12. Yet additional examples of irregular activities are represented in FIG. 16 which include an inconsistency between the quantity poured of any of the plurality of beverages and amount of beverage "vouchered" or entered into the cash register or other appropriate point of sale equipment or processor which keeps track of the price and/or quantity of beverages sold. As indicated by the included legends in this embodiment, this additional example will indicate an inconsistent quantity of beverage being poured as compared to quantity of beverage represented in the corresponding voucher for that beverage(s). Therefore a clear indication will be generated and displayed as to the vouchering of one quantity of beverage which is inconsistent with the quantity of that beverage actually poured. Further, the ability of the system 10 and the tracking assembly 30 to operate on a real time basis, in cooperation and interaction with the point of sale terminal, will allow for an immediate and real time determination and/or indication of an inconsistency between a quantity of beverage poured or dispensed and the quantity of that beverage being vouchered. Irregular activities of this type can thereby be rectified on an immediate or real time basis.

Figure 17:
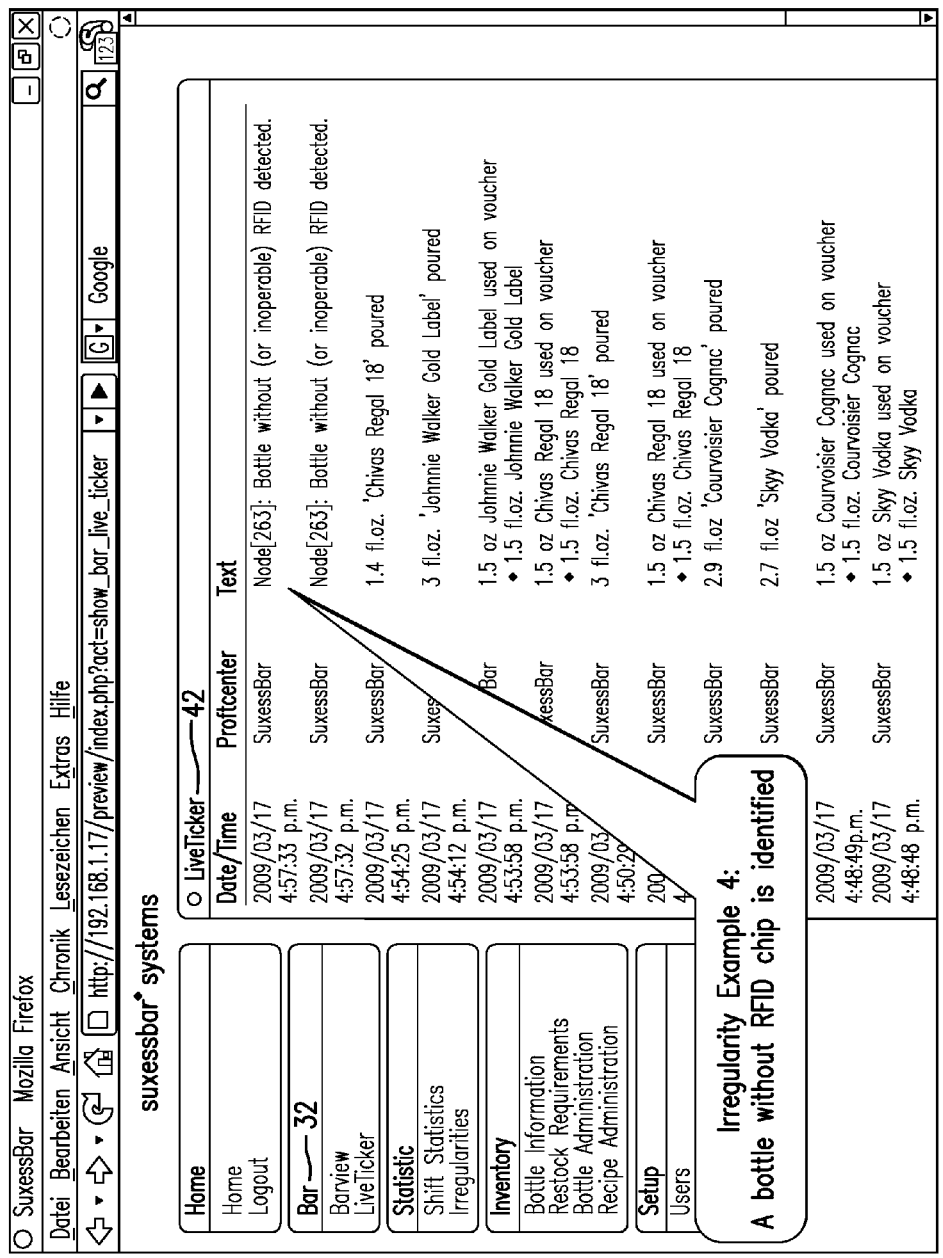
FIG. 17 is a schematic representation in the form of a screen shot associated with the function of the tracking application as represented in FIGS. 1 and 2.

With primary reference to the schematic representation of in screen shot of the embodiment of FIG. 17, yet another example of an irregular activity will be the recognition of one or more beverage containers 18 on a corresponding one or more scale structures 22, wherein the beverage container 18 was not properly entered or "logged in". An additional automatic alarm indication in a corresponding one of the display icons 68''' will also provide such an indication as represented and described above with reference to the schematic screen shot of FIG. 11. Such an indication of a non-registered or non-logged in bottle may be the result of an in-operative RFID tag 24 and or malfunctioning reader 26, or an attempt of an employee to pour from an unregistered container, as also set forth above.

Figure 19:
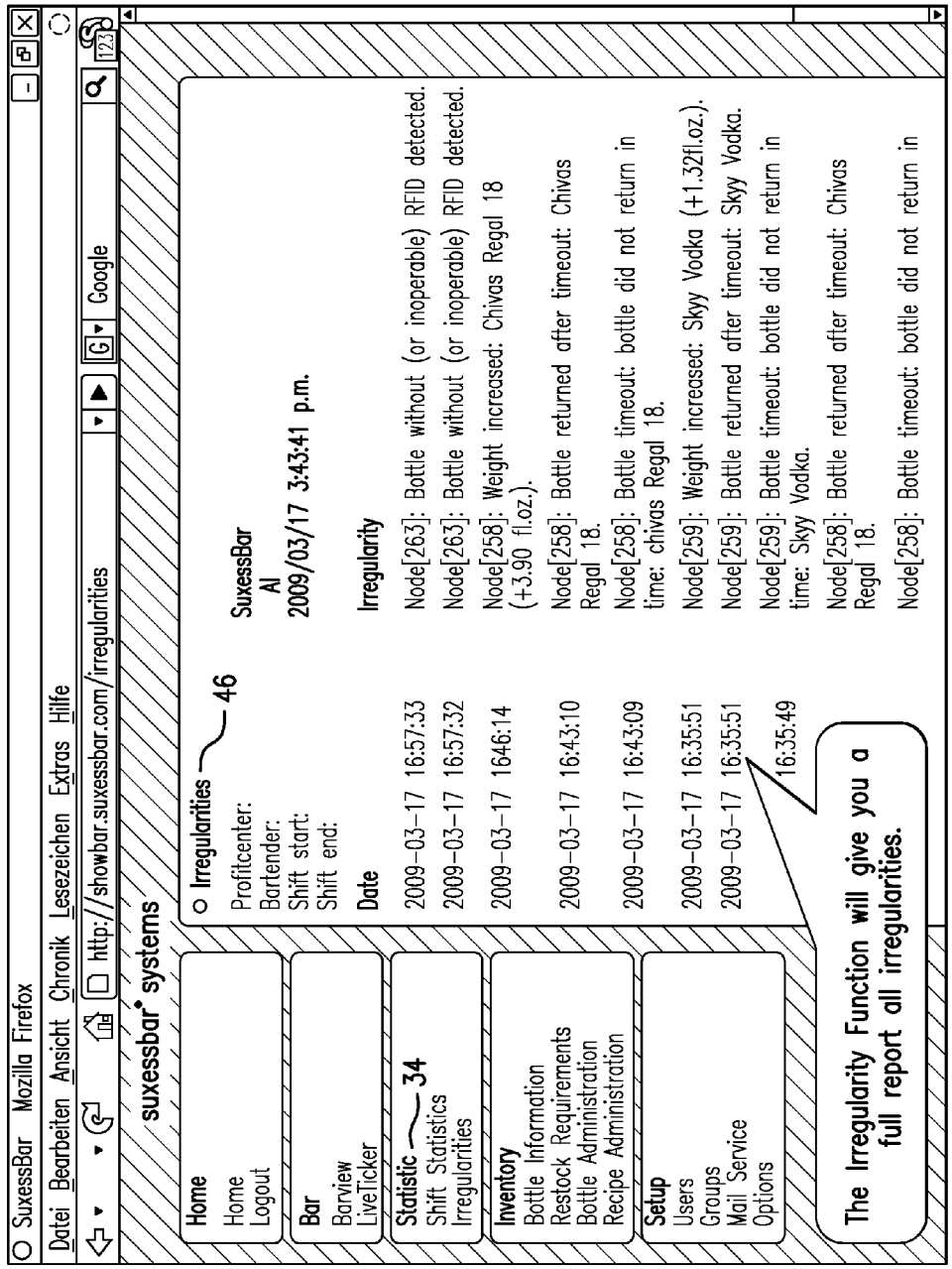
FIG. 19 is a schematic representation in the form of a screen shot directed to a function of the tracking application as represented in FIGS. 1 and 3.
Figure 21:
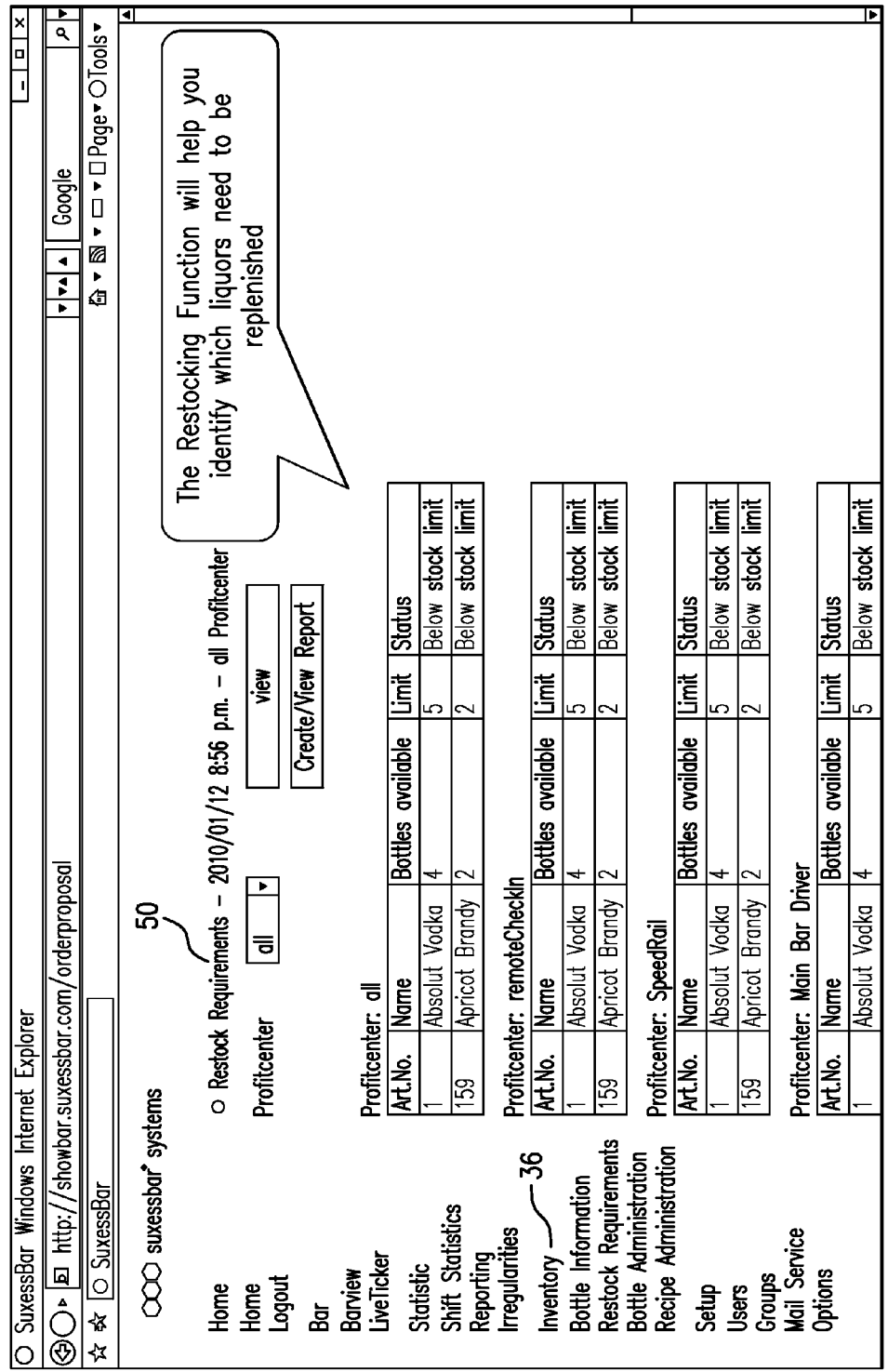
FIG. 21 is a schematic representation in the form of a screen shot directed to a function of the tracking application as represented in FIGS. 1 and 3.
Figure 23:
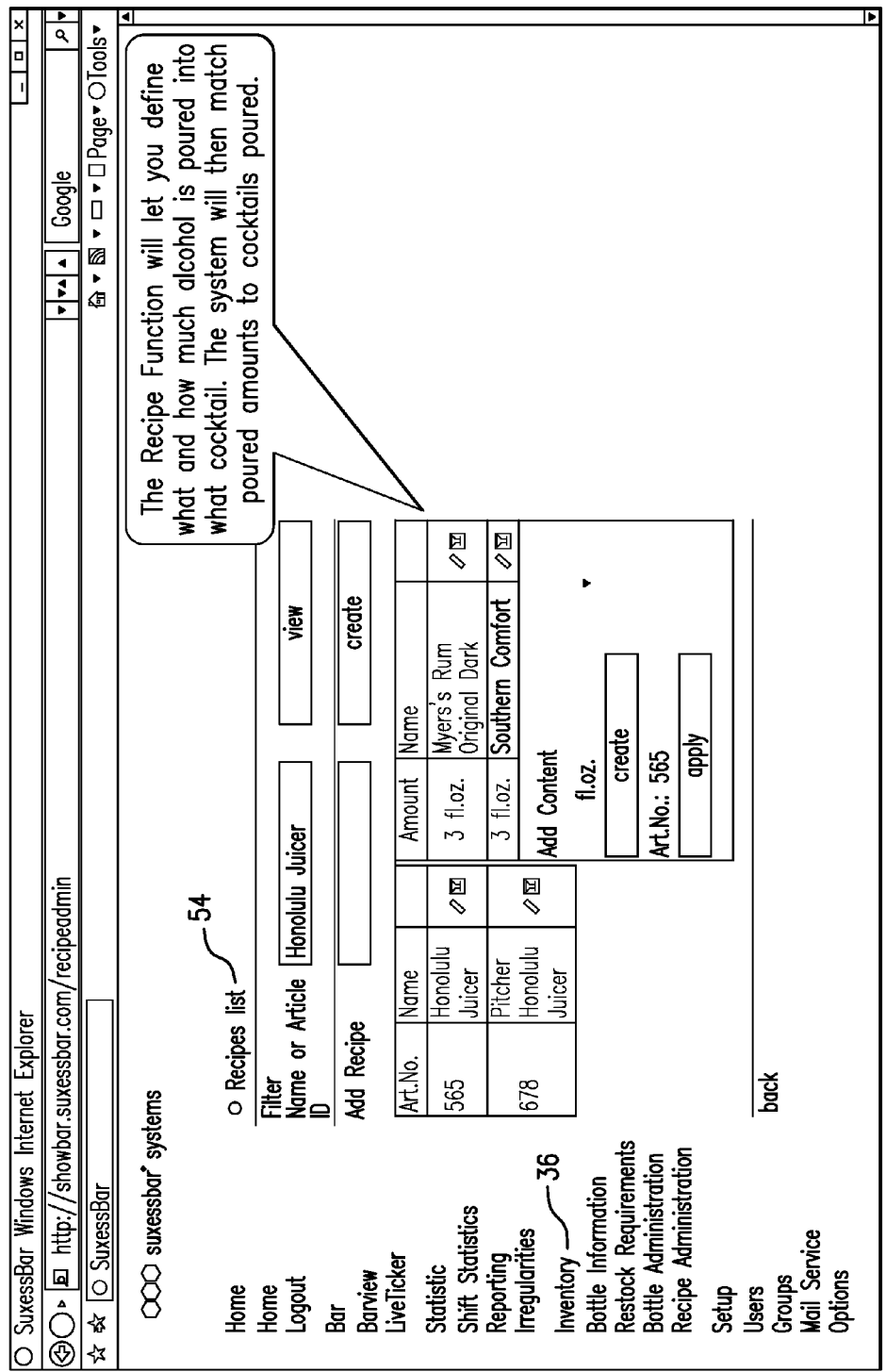
FIG. 23 is a schematic representation in the form of a screen shot associated with a function of the tracking assembly as primarily represented in FIGS. 1 and 4.
Figure 24:
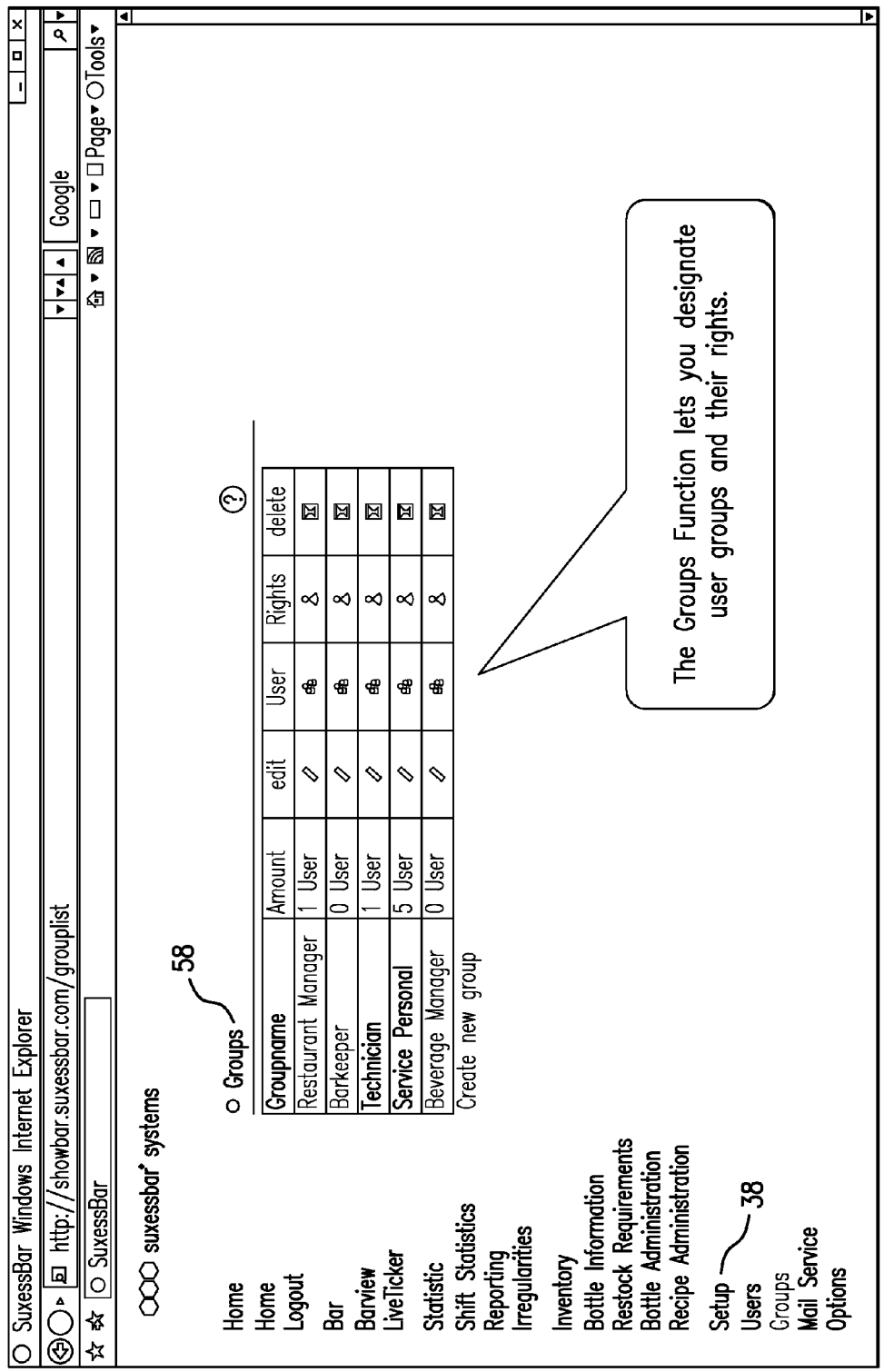
FIG. 24 is a schematic representation in the form of a screen shot of a function of the tracking application primarily represented in FIGS. 1 and 5.
Figure 25:
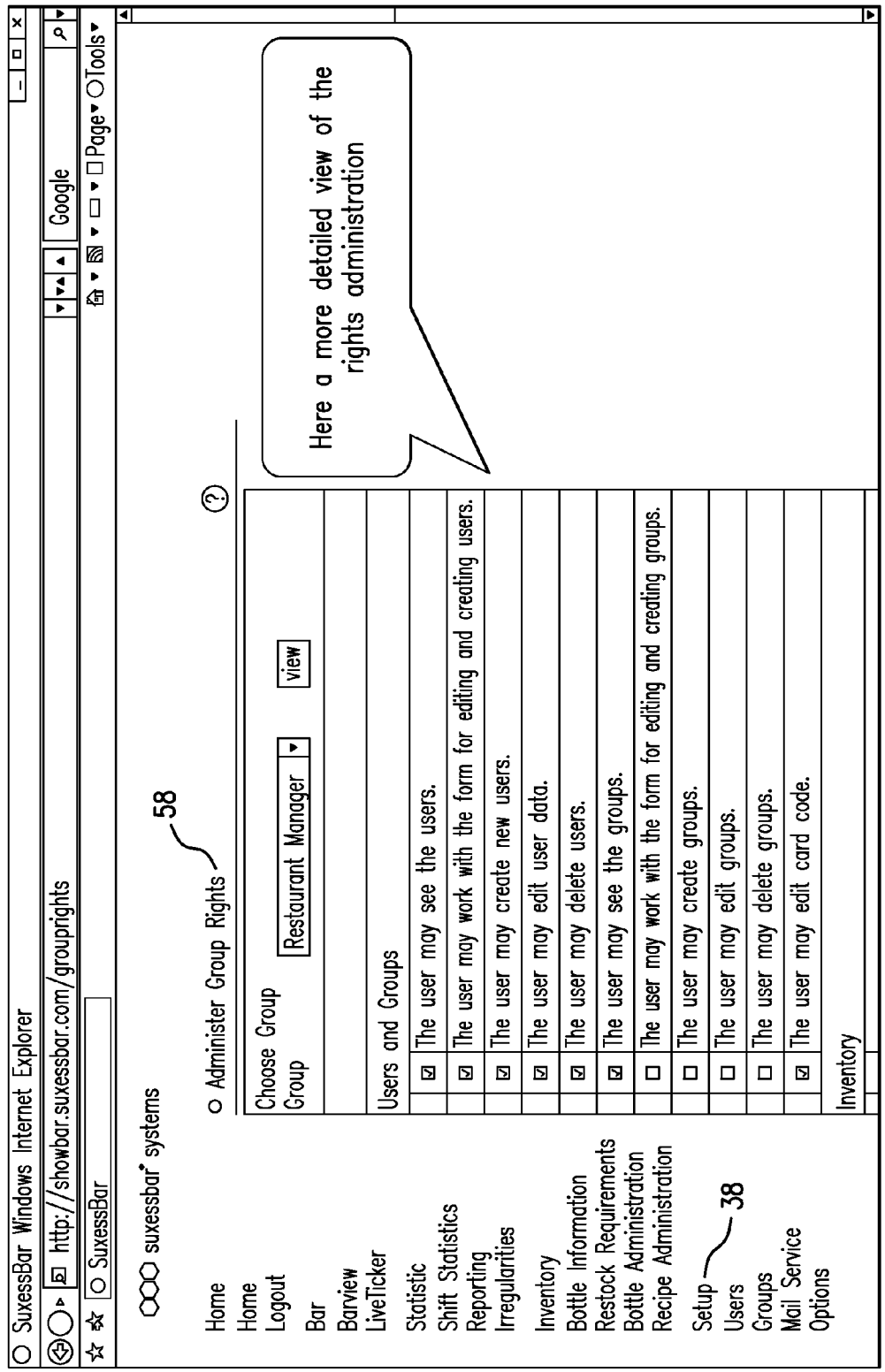
FIG. 25 is a schematic representation in the form of a screen shot of a function of the tracking application primarily represented in FIGS. 1 and 5.
Figure 26:
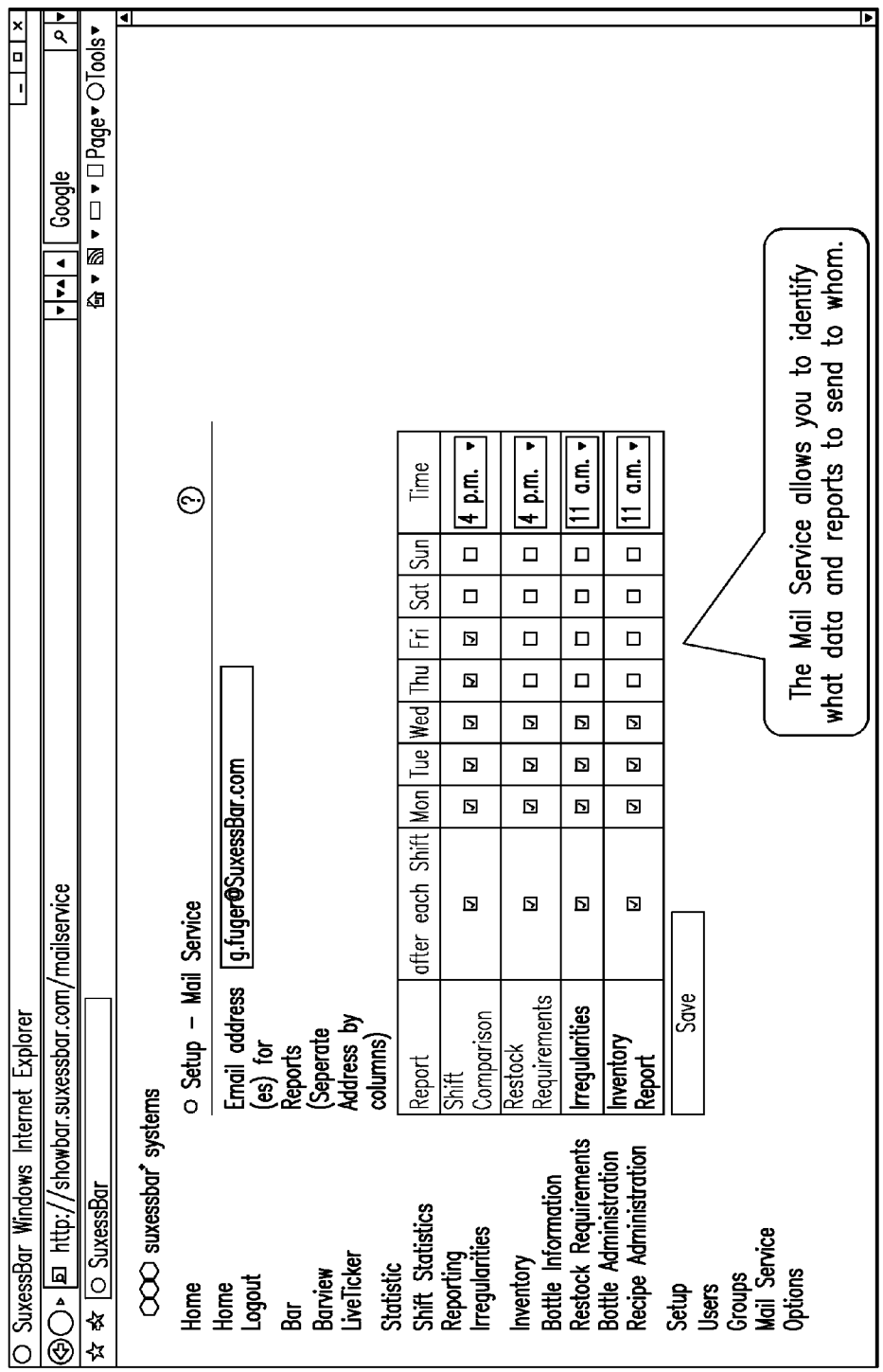
FIG. 26 is a schematic representation in the form of a screen shot of a function of the tracking application primarily represented in FIGS. 1 and 5.

As described above, the tracking application 30 further comprises a statistics monitoring function 34 which includes a functioning shift statistic module 44 and an irregular activities module 46. As presented in the screen shot representations of FIGS. 18 and 19, the shift statistic module 44 is structured in association with the display facilities 14 of processor 12 to determine and generate a summary of irregular activities, of the type set forth above, occurring over a given period of time. Such a predetermined or given period of time may be the length of a duty shift of a given employee or employees such as, but not limited to, a 6 hour, 8 hour, 10 hour shift. In addition, the statistics monitoring function 34 further comprises the irregular activity module 46 which is structured in association with the display facility 14 to determine and generate a summary of irregular activity data of the plurality of beverages as clearly represented in FIG. 19. Such summary will provide a full report of all irregular activities, of the type set forth in detail above, as well as the identification or other information data concerning the specific beverage associated with the irregular activity. Similarly, composite FIG. 19A provides both a graphical and textual Management Summary including statistical graphics indicating cost emphasis of certain irregular activities relating to differences between the quantities of beverages dispensed and vouchered in real monetary terms.

Additional features of the tracking of the present invention comprise the inclusion of a digital surveillance video facility 46' as represented in FIG. 3. The digital surveillance video facility 46' may be operatively associated with and/or accessed by the statistics monitor function 34 and or the irregular activity module 46. More specifically, upon the determination or indication of an irregular activity particularly, but not exclusively, of the type where personnel are directly involved, the video facility 46' may be accessed to visually review pre-recorded time intervals when the reported irregular activities occurred. By way of example, upon the determination of any one of a plurality of irregular activities including, but not limited to, a beverage container "time out", "back pouring" and/or inconsistencies between quantities of beverages poured and vouchered, appropriate personnel will have the ability to visually review the site and/or individual(s) associated with the irregular activities, during a brief time period when the irregular activities occurred.

As set forth above, visual access to any such irregular activity will be the result of a continuous video recording of the environment or predetermined areas thereof where the system 10 of the present invention is installed or being utilized. In addition, since the functions 32, 34, 36, 38, etc. are operative on a real time basis and report data accumulated on a real time basis, the video facility 46' can be accessed and made operable for visual surveillance of a given area in real time or on a pre-recorded basis, when an initial determination of an irregular activity occurs. As set forth above, the initial determination of the occurrence of an irregular activity may be first or initially discovered by the data appearing on the icon display 66, such as by an alarm or other indication represented by a displayed change in one or more of the changeable icons 68. Accordingly, the video facility 46' may also be operatively associated with the bar view module 40 and/or the live ticker module 42 of the bar monitoring function 32, as represented in FIG. 3.

With reference to FIGS. 20 through 23, the represented screen shots provide an operative indication of the inventory function 36 as well as corresponding functional container or "bottle" information module 48, restock monitoring module 50, bottle administration module 52 and the recipe monitoring module 54. The bottle information module 48 is structured in association with the display facility 14 to determine and visually generate a quantity summary of the plurality of beverages logged in to the system 10. The bottle information module 48 is structured in association with the display facility to determine and visually generate a summary of the inventory of the plurality of beverages as well as certain restock requirements as evidenced by operative association of the restock module 50 so as to determine and visually generate the restocking requirements for all of the plurality of beverages. In addition, the bottle administration module 52 is structured in association with the display facility 14 to determine and visually generate a summary of beverage administration data, as represented in the schematic screen shot of FIG. 22. Such administration data may include name, bottle ID, RFID tag ID, sales price, purchase cost, and minimum stock requirements.

Accordingly, the ability of the system 10 and the tracking assembly 30 to operate on a real time basis will allow for an immediate and real time determination and/or indication of the current inventory of open beverage containers 18 currently in use, as represented on the icon display 66 comprising the changeable icons 68 represented in FIGS. 8-11. The real time operation of the tracking application will also provide an immediate indication of the beverage containers 18 in stock on a real time basis through interaction of the bottle information module 48, restock requirement module 50 and bottle administration module 52 represented in FIGS. 19 through 21 as set forth in greater detail herein. Therefore information as to the entire stock and/or inventory of beverages as well as their respective rates of use or consumption will be consistently and immediately available.

The recipe monitoring or administration module 54 is structured in association with the display facility 14 to determine and visually generate beverage component data for each of a plurality of beverage recipes. By way of example only, a beverage recipe may be "long island ice tea". As such, this particular beverage recipe is aware of the specific beverage components, (tequila, rum, gin, vodka) and the quantity of each of beverage component required for completion of the beverage recipe "long island ice tea". A complete track of such recipe and beverage component data will be maintained and determined so as to be visually generated as represented in the screen shot of FIG. 23.

FIGS. 24 through 27 are schematic representations of the set-up function 38 and the included functional user's module 56 groups of authorized users, as at group's module 58, delivery or mail service module 60 and the options module 62, all of which are represented in the schematic screen shots 24 through 27. Accordingly, the group function module 58 allows the user to designate groups (bartenders) authorized access to the system as well as an indication of the duties of such individuals. Further a more detailed view of the administrators, users, groups, etc. is schematically represented in the screen shot of FIG. 25 such that an supervising manager may add, delete or otherwise alter the duties, personnel, etc. associated therewith. The mail service module 60 is determinative of which individuals are allowed access to a report log the generated data and/or reports communicated from and through the processor 12 to remote or local processors and the individuals having access thereto.

Figure 27:
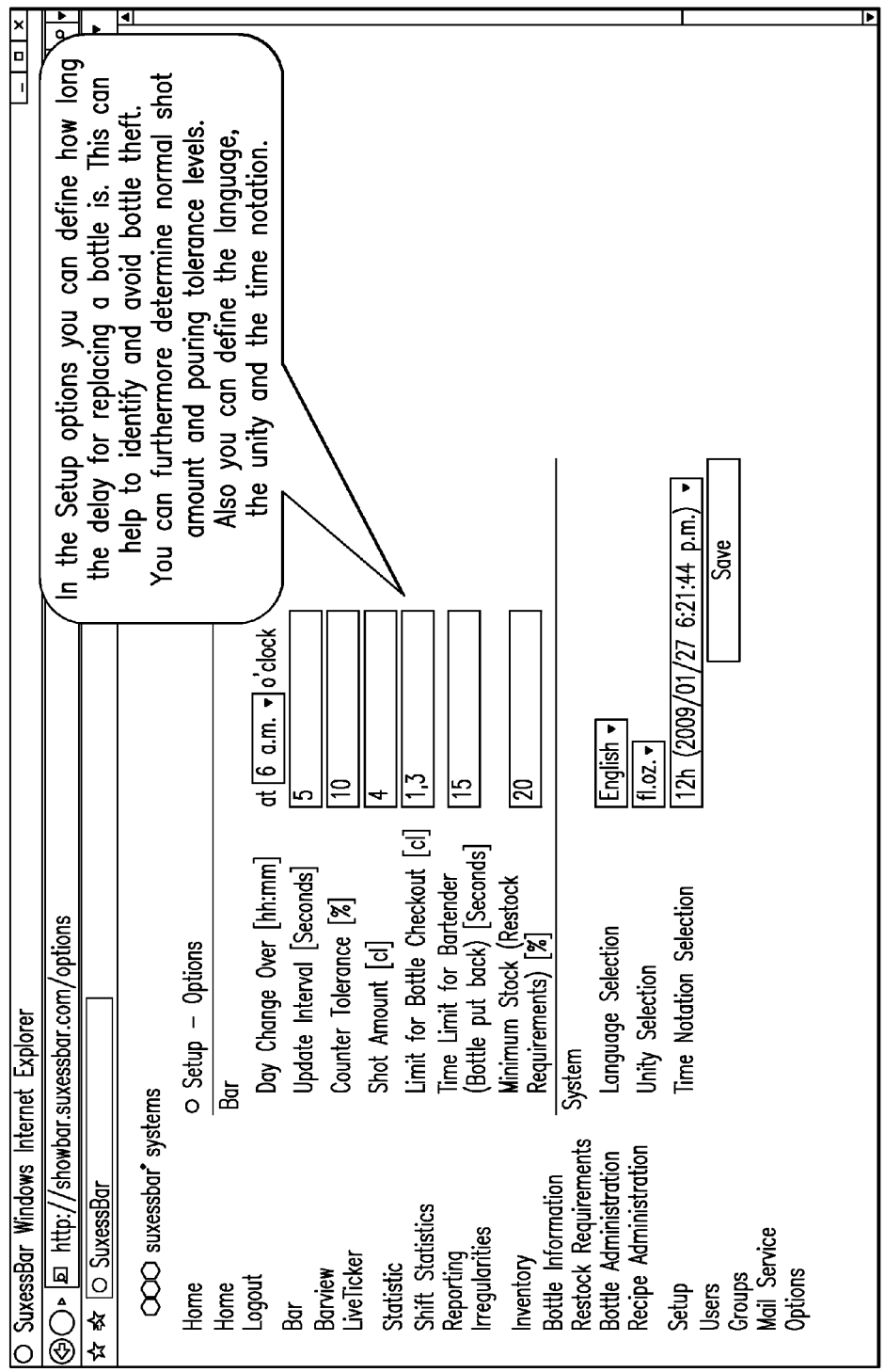
FIG. 27 is a schematic representation in the form of a screen shot of a function of the tracking application primarily represented in FIGS. 1 and 5.

Finally, the options module 62 is indicated through the schematic representation of screen shot of FIG. 27 and allows for the set up of all of operating parameters of the system 10 including those as set forth above as well as the determination, variation, correction, modification, etc. of the required or intended dispensing and/or handling activities of the plurality of beverages.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A system for monitoring of inventory and dispensing activities of a plurality of diverse beverages, said system comprising:
   a processor including display facilities and communication capabilities;
   a scale assembly comprising a plurality of scale structures, each scale structure dimensioned to receive a container for one of the plurality of beverages;
   said scale assembly communicative with said processor and disposed in supporting relation to the plurality of containers and operable to continuously determine beverage quantity through weight determination of the container when received;
   a tracking application operable on said processor and structured for real time monitoring activities of the plurality of beverages in association with said scale assembly;
   said tracking application comprising at least a bar monitoring function and an inventory function each having display capabilities associated with said display facility; and
   an identification assembly structured to communicate beverage identification data of each of said plurality of beverages to said scale assembly.

2. A system as recited in claim 1 wherein said tracking application further comprises a statistics monitoring function including a shift statistics module structured in association with said display facilities to determine and generate a summary of irregular activities occurring over a period of time.

3. A system as recited in claim 2 wherein said predetermined period of time comprises at least one duty shift of at least one employee.

4. A system as recited in claim 2 wherein said statistics monitoring function further comprises an irregular activity module structured in association with said display facility to determine and generate a summary of irregular activity data of the plurality of beverages.

5. The system of claim 1, wherein the tracking application associates each of the plurality of scale structures with the beverage quantity and the identification data of the container most recently received in each one of the plurality of scale structures, and wherein the identification data and the beverage quantity are continuously monitored and updated by the tracking application.

6. The system of claim 5, wherein the display facility displays, through the tracking application, the identification data and the beverage quantity associated with each of the plurality of scale structures.

7. The system of claim 1, wherein the plurality of containers for the plurality of beverage types are stored in their respective containers between a dispensing of the beverage.

8. The system of claim 7, wherein the tracking application continuously and automatically monitors an inventory of the plurality of diverse beverages.

9. The system of claim 1, wherein the real time monitoring activities include changes of beverage quantity or identification data of the plurality of beverages and containers.

* * * * *